(12) United States Patent
Sethumadhavan et al.

(10) Patent No.: US 10,237,059 B2
(45) Date of Patent: Mar. 19, 2019

(54) DIVERSIFIED INSTRUCTION SET PROCESSING TO ENHANCE SECURITY

(71) Applicants: Lakshminarasimhan Sethumadhavan, New York, NY (US); Kanad Sinha, New York, NY (US); Angelos Keromytis, New York, NY (US); Vasileios Pappas, New York, NY (US); Vasileios Kemerlis, New York, NY (US)

(72) Inventors: Lakshminarasimhan Sethumadhavan, New York, NY (US); Kanad Sinha, New York, NY (US); Angelos Keromytis, New York, NY (US); Vasileios Pappas, New York, NY (US); Vasileios Kemerlis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/946,961

(22) Filed: Nov. 20, 2015

(65) Prior Publication Data

US 2016/0119137 A1 Apr. 28, 2016

Related U.S. Application Data

(63) Continuation-in-part of application No. PCT/US2014/044284, filed on Jun. 26, 2014.

(60) Provisional application No. 61/841,014, filed on Jun. 28, 2013.

(51) Int. Cl.
G06F 12/14 (2006.01)
H04L 29/06 (2006.01)
(Continued)

(52) U.S. Cl.
CPC ........ *H04L 9/0825* (2013.01); *G06F 9/30178* (2013.01); *G06F 12/0897* (2013.01);
(Continued)

(58) Field of Classification Search
CPC ... H04L 9/0825; H04L 9/007; G06F 12/1408; G06F 12/0897; G06F 9/30178;
(Continued)

(56) References Cited

U.S. PATENT DOCUMENTS

| | | |
|---|---|---|
| 4,278,837 A | 7/1981 | Best |
| 6,920,562 B1 | 7/2005 | Kerr et al. |

(Continued)

OTHER PUBLICATIONS

US 2010/0122095 A1, 05/2010, Jones et al. (withdrawn)
(Continued)

*Primary Examiner* — Aravind Moorthy
(74) *Attorney, Agent, or Firm* — Occhiuti & Rohlicek LLP

(57) ABSTRACT

Disclosed are devices, systems, apparatus, methods, products, and other implementations, including a method that includes receiving a block of information from non-processor memory at an interface between the non-processor memory and processor memory comprising two or more processor memory levels, determining whether the block of information received from the non-processor memory at the interface corresponds to encrypted instruction code, and decrypting the block of information at the interface between the non-processor memory and the processor memory for storage in one of the two or more levels of the processor memory in response to a determination that the received block of information corresponds to the encrypted instruction code. The block of information is stored at the one of the
(Continued)

two or more levels of the processor memory without being decrypted when the received block of information is determined to correspond to data.

22 Claims, 8 Drawing Sheets

(51) Int. Cl.
  *H04L 9/08* (2006.01)
  *H04L 9/00* (2006.01)
  *H04L 9/28* (2006.01)
  *G06F 21/72* (2013.01)
  *G06F 9/30* (2018.01)
  *G06F 12/0897* (2016.01)
  *G06F 21/12* (2013.01)
  *G06F 21/57* (2013.01)

(52) U.S. Cl.
  CPC .......... *G06F 12/1408* (2013.01); *G06F 21/72* (2013.01); *H04L 9/007* (2013.01); *G06F 21/123* (2013.01); *G06F 21/575* (2013.01); *G06F 2212/1052* (2013.01)

(58) Field of Classification Search
  CPC ............. G06F 21/72; G06F 2212/1052; G06F 21/123; G06F 21/575
  USPC ....................... 713/190, 165; 380/278, 44, 28
  See application file for complete search history.

(56) References Cited

U.S. PATENT DOCUMENTS

| | | | |
|---|---|---|---|
| 7,996,671 | B2 | 8/2011 | Chheda et al. |
| 2005/0265336 | A1* | 12/2005 | Mogi ...................... G06F 13/28 370/389 |
| 2006/0280301 | A1* | 12/2006 | Oliveira ............... H04N 7/1675 380/212 |
| 2007/0220601 | A1 | 9/2007 | Huelsbergen et al. |
| 2008/0127125 | A1 | 5/2008 | Anckaert et al. |
| 2009/0300590 | A1 | 12/2009 | Moritz |
| 2009/0307436 | A1* | 12/2009 | Larson ................ G06F 11/0712 711/148 |
| 2010/0077227 | A1 | 3/2010 | Young |
| 2010/0281273 | A1 | 11/2010 | Lee et al. |
| 2010/0299480 | A1 | 11/2010 | Hobson et al. |
| 2011/0060915 | A1* | 3/2011 | Tal ...................... G06F 21/6218 713/189 |
| 2011/0258416 | A1 | 10/2011 | Moritz |
| 2011/0296204 | A1 | 12/2011 | Henry et al. |
| 2012/0036351 | A1 | 2/2012 | Peet, Jr. et al. |
| 2012/0066516 | A1 | 3/2012 | McIntosh et al. |
| 2012/0096282 | A1 | 4/2012 | Henry et al. |
| 2012/0102336 | A1 | 4/2012 | Chheda et al. |
| 2013/0145132 | A1 | 6/2013 | Moritz |
| 2013/0151865 | A1 | 6/2013 | Moritz et al. |
| 2013/0275755 | A1* | 10/2013 | Ignatchenko ....... H04L 63/0428 713/168 |
| 2013/0305038 | A1* | 11/2013 | Sproles ............... H04L 63/0485 713/152 |
| 2013/0326236 | A1 | 12/2013 | Chheda et al. |
| 2014/0089679 | A1* | 3/2014 | Goffmann ............. G06F 21/125 713/190 |

OTHER PUBLICATIONS

White, S. R., & Comerford, L. (Jun. 1990). ABYSS: An Architecture for Software Protection. IEEE Transactions on Software Engineering, 16(6), 619-629. http://dx.doi.org/10.1109/32.55090.

Forrest, S., Somayaji, A., & Ackley, D. H. (May 1997). Building Diverse Computer Systems. Proceedings of 6th Workshop on Hot Topics in Operating Systems, 67-72. IEEE.

Solar Designer. (Aug. 10, 1997). Getting around non-executable stack (and fix). Message posted to Bugtraq Mailing List. 7 pgs. Retrieved on Apr. 5, 2017 from http://seclists.org/bugtraq/1997/Aug/63.

Lie, D., Thekkath, C., Mitchell, M., Lincoln, P., Boneh, D., Mitchell, J., & Horowitz, M. (Nov. 2000). Architectural Support for Programming Languages and Operating Systems (ASPLOS-IX), 35(11), 168-177. Retrieved from http://www.csl.sri.com/papers/lincolnxom2000/.

Ször, P., & Ferrie, P. (Sep. 2001). Hunting for Metamorphic. 24 pgs. Retrieved from http://www.symantec.com/avcenter/reference/hunting.for.metamorphic.pdf.

National Institute of Standards and Technology (NIST). (Nov. 26, 2001). Federal Information Processing Standards Publication 197, Advanced Encryption Standard (AES). 1-47. Retrieved from http://nvlpubs.nist.gov/nistpubs/FIPS/NIST.FIPS.197.pdf.

Dworkin, M. (Dec. 2001). Recommendation for Block Cipher Modes of Operation. Methods and Techniques (NIST Special Publication 800-38A), 66 pgs. Gaithersburg, MD: U.S.Computer Security Division. Information Technology Laboratory. National Institute of Standards and Technology.

Nergal. (Dec. 27, 2001). The advanced return-into-lib(c) exploits: PaX case study. Phrack. 10(58), 30 pgs. Retrieved from http://www.phrack.org/issues.html? Issue=58&id=4#article.

PAX Team. (Mar. 15, 2003). Address Space Layout Randomization (ASLR). In Documentation for the PaX Project. Retrieved from http://pax.grsecurity.net/docs/aslr.txt.

Suh, G. E., Clarke, D., Gassend, B., Van Dijk, M., & Devadas, S. (Jun. 23-26, 2003). AEGIS: architecture for tamper-evident and tamper-resistant processing. Proceedings of the 17th Annual International Conference on Supercomputing (ICS '03), 160-171. ACM.

Barrantes, E. G., Ackley, D. H., Palmer, T. S., Stefanovic, D., & Zovi, D. D. (Oct. 27-30, 2003). Randomized Instruction Set Emulation to Disrupt Binary Code Injection Attacks. Proceedings of the 10th ACM conference on Computer and Communications Security (CCS '03), 281-289. ACM.

KC, G. S., Keromytis, A. D., & Prevelakis, V. (Oct. 27-30, 2003). Countering Code-Injection Attacks With Instruction-Set Randomization. Proceedings of the 10th ACM Conference on Computer and Communications Security (CCS '03), 272-280. ACM.

Suh, G. E., Clarke, D., Gassend, B., Dijk, M. V., & Devadas, S. (Dec. 3, 2003). Efficient Memory Integrity Verification and Encryption for Secure Processors. Proceedings of the 36th Annual IEEE/ACM International Symposium on Microarchitecture (MICRO 36), 339-351. IEEE Computer Society.

Abadi, M., Budiu, M., Erlingsson, U. & Ligatti, J. (Nov. 7, 2005). Control-flow integrity. Proceedings of the 12th ACM Conference on Computer and Communications Security (CCS'05), 340-353. ACM. Http://dx.doi.org/10.1145/1102120.1102165.

Lee, R. B., Kwan, P., McGregor, J. P., Dwoskin, J., & Wang, Z. (Jun. 4-8, 2005). Architecture for Protecting Critical Secrets in Microprocessors. Proceedings of the 32nd Annual International Symposium on Computer Architecture (ISCA '05), 2-13. IEEE Computer Society. Http://dx.doi.org/10.1109/ISCA.2005.14.

Shi, W., Lee, H. H. S., Ghosh, M., Lu, C., & Boldyreva, A. (Jun. 4-8, 2005). High efficiency counter mode security architecture via prediction and precomputation. Proceedings of the 32nd Annual International Symposium on Computer Architecture (ISCA '05), 14-24. IEEE Computer Society. http://dx.doi.org/10.1109/ISCA.2005.30CA.2005.30.

Sovarel, A. N., Evans, D., & Paul, N. (Aug. 3, 2005). Where's the FEEB? The Effectiveness of Instruction Set Randomization. 14th USENIX Security Symposium (Security '05), 16 pgs. Retrieved from https://www.usenix.org/legacy/publications/library/proceedings/sec05/tech/full_papers/sovarel/sovarel_html/.

Trusted Computing Group. (Oct. 25, 2005). Home Page. Captured on Oct. 25, 2005 from https://www.trustedcomputinggroup.org/home by Internet Archive as http://web.archive.org/web/20051025151904/https://www.trustedcomputinggroup.org/home.

Sun Microsystems Inc. (2006). OpenSPARC T1 Micro Architecture Specification. Retrieved from http://users.ece.utexas.edu/~mcdermot/vlsi-2/OpenSPARCT1_Micro_Arch.pdf.

(56) References Cited

OTHER PUBLICATIONS

Yan, C., Englender, D., Prvulovic, M., Rogers, B., & Solihin, Y. (Jun. 17-21, 2006). Improving Cost, Performance, and Security of Memory Encryption and Authentication. Proceedings of the 33rd Annual International Symposium on Computer Architecture (ISCA '06), 179-190. IEEE Computer Society. Http://dx.doi.org/10.1109/ISCA.2006.22.

Provos, N., McNamee, D., Mavrommatis, P., Wang, K., & Modadugu, N. (2007). The Ghost in the Browser: Analysis of Web-based Malware. Proceedings of the 1st Workshop on Hot Topics in Understanding Botnets (HotBots). USENIX, 9 pgs. Retrieved from https://www.usenix.org/legacy/events/hotbots07/tech/full_papers/provos/provos.pdf?36,05,11,22,03,2008.

Spengler, B. (Mar. 3, 2007). On exploiting null ptr derefs, disabling SELinux, and silently fixed Linux vulns. Message posted to Dailydave Mailing List. Retrieved on Apr. 5, 2017 from http:// seclists.org/dailydave/2007/q1/224.

Shacham, H. (Oct. 28, 2007). The geometry of innocent flesh on the bone: return-into-libc without function calls (on the x86). Proceedings of the 14th ACM Conference on Computer and Communications Security (CCS '07), 552-561. ACM. http://dx.doi.org/10.1145/1315245.1315313 45.1315313.

Wagner, I., Bertacco, V., & Austin, T. (Jan. 31, 2008). Using Field-Repairable Control Logic to Correct Design Errors in Microprocessors. IEEE Transactions on Computer-Aided Design of Integrated Circuits and Systems, 380-393. http://dx.doi.org/10.1109/TCAD.2007.907239.

Parno, B. (Jul. 2008). Bootstrapping Trust in a "Trusted" Platform. Proceedings of the 3rd Conference on Hot Topics in Security (HOTSEC'08). USENIX, 6 pgs. Retrieved from http://static.usenix.org/events/hotsec08/tech/full_papers/parno/parno.pdf.

Sacco, A. L., & Ortega, A. A. (Jun. 2009). Persistent BIOS Infection. [PowerPoint slides]. Retrieved from http://www.phrack.com/issues.html? issue=66&id=7.

Wojtczuk, R., & Tereshkin, A. (Jul. 30, 2009). Attacking Intel BIOS [PowerPoint slides]. 105 pgs. Retrieved from http://www.blackhat.com/presentations/bh-usa-09/WOJTCZUK/BHUSA09-Wojtczuk-AtkIntelBios-SLIDES.pdf.

Parno, B., McCune, J. M., & Perrig, A. (May 16-19, 2010). Bootstrapping Trust in Commodity Computers. 2010 IEEE Symposium on Security and Privacy (SP), 414-429. IEEE. doi:10.1109/SP.2010.32.

Boyd, S. W., KC, G. S., Locasto, M. E., Keromytis, A. D., & Prevelakis, V. (Jul. 2010). On the General Applicability of Instruction-Set Randomization. IEEE Transactions on Dependable and Secure Computing, 7(3), 255-270.

Binsalleeh, H., Ormerod, T., Boukhtouta, A., Sinha, P., Youssef, A., Debbabi, M., & Wang, L. (Aug. 2010). On the Analysis of the Zeus Botnet Crimeware Toolkit. Eighth Annual International Conference on Privacy Security and Trust (PST), 31-38. IEEE.

Onarlioglu, K., Bilge, L., Lanzi, A., Balzarotti, D., & Kirda, E. (Dec. 6-10, 2010). G-Free: Defeating Return-Oriented Programming through Gadget-Less Binaries. Proceedings of the 26th Annual Computer Security Applications Conference (ACSAC), 49-58.

Portokalidis, G., & Keromytis, A. D. (Dec. 6-10, 2010). Fast and practical instruction-set randomization for commodity systems. Proceedings of the 26th Annual Computer Security Applications Conference (ACSAC '10), 41-48. ACM. Http://dx.doi.org/10.1145/1920261.1920268.

Williams, P., & Boivie, R. ( 2011). CPU support for secure executables. In J. M. McCune, B. Balacheff, A. Perrig, A.-R. Sadeghi, A. Sasse, & Y. Beres. (Eds.) Proceedings of the 4th International Conference on Trust and Trustworthy Computing (TRUST 2011) (pp. 172-187). New York: Springer.

Azab, A. M., Ning, P., & Zhang, X. (Oct. 2011). SICE: A Hardware-Level Strongly Isolated Computing Environment for x86 Multi-core Platforms. Proceedings of the 18th ACM Conference on Computer and Communications Security (CCS '11), 375-388. ACM.

National Science and Technology Council. (Dec. 2011). Trustworthy Cyberspace: Strategic Plan for the Federal Cybersecurity Research and Development Program. Retrieved from https://obamawhitehouse.archives.gov/sites/default/files/microsites/ostp/fed_cybersecurity_rd_strategic_plan_2011.pdf.

Goncharov, M. (2012) Russian Underground. Trend Micro Incorporated Research Paper. 29 pgs. Retrieved from https://www.trendmicro.de/cloud-content/us/pdfs/security-intelligence/white-papers/wp-russian-underground-101.pdf.

Symantec Corporation. (Apr. 2012). Symantec Internet Security Threat Report. 52 pgs. Retrieved from https://www.symantec.com/content/dam/symantec/docs/security-center/archives/istr-12-april-volume-17-en.pdf.

Hiser, J., Nguyen-Tuong, A., CO, M., Hall, M., & Davidson, J. W. (May 2012). ILR: Where'd My Gadgets Go? 2012 IEEE Symposium on Security and Privacy (SP), 571-585. IEEE.

Pappas, V., Polychronakis, M., & Keromytis, A. D. (May 20-23, 2012). Smashing the Gadgets: Hindering Return-Oriented Programming Using In-place Code Randomization. 2012 IEEE Symposium on Security and Privacy (SP), 601-615.

Kayaalp, M., Ozsoy, M., Abu-Ghazaleh, N., & Ponomarev, D. (Jun. 9-13, 2012). Branch regulation: Low-overhead protection from code reuse attacks. 2012 39th Annual International Symposium on Computer Architecture (ISCA), 94-105. IEEE doi:10.1109/ISCA.2012.6237009.

Mac Developer Library. (Jul. 23, 2012). Code Signing Guide. Retrieved from https://developer.apple.com/library/mac/documentation/Security/Conceptual/CodeSigningGuide/CodeSigningGuide.pdf.

Kemerlis, V. P., Portokalidis, G., & Keromytis, A. D. (Aug. 8-10, 2012). kGuard: Lightweight Kernel Protection against Return-to-User Attacks. 21st USENIX Security Symposium, 459-474. Retrieved from https://www.usenix.org/system/files/conference/usenixsecurity12/sec12-final143.pdf.

Mitre Corporation. (Nov. 2012). Common Weakness Enumeration. [Software]. 4 pgs. Available from http://cwe.mitre.org/data/definitions/94.html.

Stone-Gross, B., Abman, R., Kemmerer, R. A., Kruegel, C., Steigerwald, D. G., & Vigna, G. (2013). The Underground Economy of Fake Antivirus Software. In B. Schneier (Ed.) Economics of Information Security and Privacy III (pp. 55-78). New York: Springer.

International Search Report & Written Opinion of the International Search Authority (EPO) dated Oct. 24, 2014, for International Application No. PCT/US2014/044284, 8 pgs.

International Preliminary Report on Patentability for International Application No. PCT/US2014/044284, dated Dec. 29, 2015, 7 pgs.

Lavasoft. (n.d.). A Closer Look at Zlob Trojans. 3 pgs. Retrieved on Apr. 5, 2017 from http://www.lavasoft.com/support/spywareeducationcenter/zlobtrojans.php.

Xilinx. (n.d.) Xilinx University Program XUPV5-LX110T Development System. 1 pg. Retrieved from http://www.xilinx.com/univ/xupv5-lx110t.htm.

\* cited by examiner

DIVERSIFIED INSTRUCTION SET PROCESSING TO ENHANCE SECURITY

CROSS-REFERENCE TO RELATED APPLICATIONS

This application is a continuation-in-part application of, and claims priority to, International Application No. PCT/US2014/044284, entitled "DIVERSIFIED INSTRUCTION SET PROCESSING TO ENHANCE SECURITY," and filed Jun. 26, 2014, which in turn claims the benefit of, and priority to, U.S. Provisional Patent Application No. 61/841,014, entitled "PROCESSING OF DIVERSIFIED INSTRUCTION SETS TO ENHANCE SECURITY," and filed Jun. 28, 2013, the contents of which are incorporated herein by reference in their entireties.

STATEMENT REGARDING FEDERALLY SPONSORED RESEARCH

This invention was made with government support under FA 8750-10-2-0253 awarded by the Defense Advanced Research Projects Agency (DARPA). The government has certain rights in the invention.

BACKGROUND

Despite the variety of choices regarding hardware and software, to date a large number of computer systems remain identical. Characteristic examples of this trend are Windows on x86 and Android on ARM. This homogeneity, sometimes referred to as "computing oligoculture," provides a fertile ground for malware in the highly networked world of today.

One way to counter this problem is to diversify systems so that attackers cannot quickly and easily compromise a large number of machines. For instance, if each system has a different hardware/software interface, the attacker has to invest more time in developing exploits that run on every system manifestation. It is not that each individual attack gets harder, but the spread of malware slows down. Further, if the diversified instruction set architectures (ISA) are kept secret from the attacker, the bar for exploitation is raised even higher.

SUMMARY

In some variations, a method is provided that includes receiving a block of information from non-processor memory at an interface between the non-processor memory and processor memory comprising two or more processor memory levels, determining whether the block of information received from the non-processor memory at the interface corresponds to encrypted instruction code, and decrypting the block of information at the interface between the non-processor memory and the processor memory for storage in one of the two or more levels of the processor memory in response to a determination that the received block of information corresponds to the encrypted instruction code. The block of information is stored at the one of the two or more levels of the processor memory without being decrypted when the received block of information is determined to correspond to data.

Embodiments of the method may include at least some of the features described in the present disclosure, including one or more of the following features.

The processor memory may include cache memory of a central processing unit (CPU) organized in two or more cache memory levels, and the non-processor memory may include random access memory.

Determining whether the block of information received from the non-processor memory at the interface corresponds to the encrypted instruction code may include determining whether the block of information received from the non-processor memory at the interface corresponds to the encrypted instruction code based on a request sent for the block of information.

Determining whether the block of information received from the non-processor memory corresponds to the encrypted instruction code may include determining that the block of information received from the non-processor memory at the interface corresponds to the encrypted instruction code when the request for the block of information is associated with a portion of the processor-memory configured to store instructions.

The method may further include associating an identifier with the received block of information, and setting the identifier to a value indicating one of instructions or data based on the determination of whether the block of information corresponds to the encrypted instruction code received from the non-processor memory.

The method may further include determining, in response to a fetch request made by an instruction portion of another level of the two or more levels of the processor memory for at least a portion of the block of information stored at the one of the two or more levels of the processor memory, whether the identifier associated with the block of information stored at the one of the two or more levels of the two or more levels of the processor memory corresponds to the instructions, and performing one of, for example: transferring the at least the portion of the block of information stored at the one of the two or more levels of the processor memory to the instruction portion of the other of the two or more levels of the processor memory when the identifier associated with the block of information is determined to correspond to the instructions, or removing the block of information from the processor memory when the identifier associated with the block of information is determined to correspond to the data, and causing the block of information to be retrieved again from the non-processor memory in order to perform a decryption operation on the block of information retrieved again.

The method may further include determining, in response to a fetch request made by a data portion of another level of the two or more levels of the processor memory for at least a portion of the block of information stored at the one of the two or more levels of the processor memory, whether the identifier associated with the block of information stored at the one of the two or more levels of the processor memory corresponds to the data, and performing one of, for example: transferring the at least the portion of the block of information stored at the one of the two or more levels of the processor memory to the data portion of the other of the two or more levels of the processor memory when the identifier associated with the block of information indicates that the block of information corresponds to the data, or removing the block of information from the processor memory when the identifier associated with the block of information indicates that the block of information correspond to the instructions, and causing the block of information to be retrieved again from the non-processor memory in order to be transferred into the processor memory without being decrypted.

Decrypting the block of information corresponding to the encrypted instruction code at the interface between the processor-memory and the non-processor memory may include decrypting the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device.

Decrypting the block of information corresponding to the encrypted instruction code with the one or more first keys assigned to the first controller device may include decrypting the encrypted instruction code with one or more first symmetric keys according to a counter mode encryption/decryption process. The one or more first symmetric keys may include one of, for example, a single symmetric key used for any encrypted instruction code retrieved by the first controller device, and/or multiple symmetric keys with each of the multiple symmetric key used for respective encrypted instructions from a respective one of different memory pages stored in the non-processor memory coupled to the first controller device.

Decrypting the block of information corresponding to the encrypted instruction code at the interface between the processor-memory and the non-processor memory may include retrieving from the non-processor memory one or more symmetric keys, encrypted using a public key of a private-public key pair for a processor, associated with a code page, and deriving the one or more symmetric keys from the encrypted one or more symmetric keys using a private key of the private-public key pair for the processor.

Retrieving the one or more symmetric keys may include retrieving the encrypted one or more symmetric keys during page-fault-processing to retrieve into the non-processor memory the code page.

Deriving the one or more symmetric keys may include deriving from the encrypted one or more symmetric keys one or more AES keys.

In some variations, a system is provided that includes a processor including processor memory with two or more processor memory levels, and a decryption unit at an interface between non-processor memory and the processor memory. The decryption unit is configured to receive a block of information from the non-processor memory, determine whether the block of information received from the non-processor memory corresponds to encrypted instruction code, and decrypt the block of information for storage in one of the two or more levels of the processor memory in response to a determination that the received block of information corresponds to the encrypted instruction code. The block of information is stored at the one of the two or more levels of the processor memory without being decrypted when the received block of information is determined to correspond to data.

Embodiments of the system may include at least some of the features described in the present disclosure, including at least some of the features described above in relation to the method, as well as one or more of the following features.

The decryption unit configured to determine whether the block of information received from the non-processor memory at the interface corresponds to the encrypted instruction code may be configured to determine whether the block of information received from the non-processor memory at the interface corresponds to the encrypted instruction code based on a request sent for the block of information.

The decryption unit configured to determine whether the block of information received from the non-processor memory corresponds to the encrypted instruction code may be configured to determine that the block of information received from the non-processor memory at the interface corresponds to the encrypted instruction code when the request for the block of information is associated with a portion of the processor-memory configured to store instructions.

The decryption unit may further be configured to associate an identifier with the received block of information, and set the identifier to a value indicating one of instructions or data based on the determination of whether the block of information corresponds to the encrypted instruction code received from the non-processor memory.

The processor may be configured to determine, in response to a fetch request made by an instruction portion of another level of the two or more levels of the processor memory for at least a portion of the block of information stored at the one of the two or more levels of the processor memory, whether the identifier associated with the block of information stored at the one of the two or more levels of the two or more levels of the processor memory corresponds to the instructions, and perform one of, for example: transferring the at least the portion of the block of information stored at the one of the two or more levels of the processor memory to the instruction portion of the other of the two or more levels of the processor memory when the identifier associated with the block of information is determined to correspond to the instructions, or removing the block of information from the processor memory when the identifier associated with the block of information is determined to correspond to the data, and causing the block of information to be retrieved again from the non-processor memory in order to perform a decryption operation on the block of information retrieved again.

The processor may be configured to determine, in response to a fetch request made by a data portion of another level of the two or more levels of the processor memory for at least a portion of the block of information stored at the one of the two or more levels of the processor memory, whether the identifier associated with the block of information stored at the one of the two or more levels of the processor memory corresponds to the data, and perform one of, for example, transferring the at least the portion of the block of information stored at the one of the two or more levels of the processor memory to the data portion of the other of the two or more levels of the processor memory when the identifier associated with the block of information indicates that the block of information corresponds to the data, or removing the block of information from the processor memory when the identifier associated with the block of information indicates that the block of information correspond to the instructions, and causing the block of information to be retrieved again from the non-processor memory in order to be transferred into the processor memory without being decrypted.

The decryption unit configured to decrypt the block of information corresponding to the encrypted instruction code at the interface between the processor-memory and the non-processor memory may be configured to decrypt the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device. The decryption unit configured to decrypt the block of information corresponding to the encrypted instruction code with the one or more first keys assigned to the first controller device may be configured to decrypt the encrypted instruction code with one or more first symmetric keys according to a counter mode encryption/decryption process. The one or more first symmetric keys may include one of, for example, a single symmetric key used for any encrypted instruction code retrieved by the first controller device, and/or multiple symmetric keys with each of the multiple symmetric key used for respective encrypted instructions from a respective one of different memory pages stored in the non-processor memory coupled to the first controller device.

The decryption unit configured to decrypt the block of information corresponding to the encrypted instruction code at the interface between the processor-memory and the non-processor memory may be configured to retrieve from the non-processor memory one or more symmetric keys, encrypted using a public key of a private-public key pair for a processor, associated with a code page, and derive the one or more symmetric keys from the encrypted one or more symmetric keys using a private key of the private-public key pair for the processor.

In some variations, a computer readable media storing a set of instructions executable on at least one programmable device is provided. The set of instructions, when executed, causes operations that include receiving a block of information from non-processor memory at an interface between the non-processor memory and processor memory comprising two or more processor memory levels, determining whether the block of information received from the non-processor memory at the interface corresponds to encrypted instruction code, and decrypting the block of information at the interface between the non-processor memory and the processor memory for storage in one of the two or more levels of the processor memory in response to a determination that the received block of information corresponds to the encrypted instruction code. The block of information is stored at the one of the two or more levels of the processor memory without being decrypted when the received block of information is determined to correspond to data.

Embodiments of the computer readable media may include at least some of the features described in the present disclosure, including at least some of the features described above in relation to the method and the system.

In some variations, an apparatus is provided. The apparatus includes means for receiving a block of information from non-processor memory at an interface between the non-processor memory and processor memory comprising two or more processor memory levels, means for determining whether the block of information received from the non-processor memory at the interface corresponds to encrypted instruction code, and means for decrypting the block of information at the interface between the non-processor memory and the processor memory for storage in one of the two or more levels of the processor memory in response to a determination that the received block of information corresponds to the encrypted instruction code. The block of information is stored at the one of the two or more levels of the processor memory without being decrypted when the received block of information is determined to correspond to data.

Embodiments of the apparatus may include at least some of the features described in the present disclosure, including at least some of the features described above in relation to the method, the system, and the computer readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, is meant to encompass variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, is also meant to encompass variations of ±20% or ±10%, ±5%, or +0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

As used herein, including in the claims, unless otherwise stated, a statement that a function, operation, or feature, is "based on" an item and/or condition means that the function, operation, function is based on the stated item and/or condition and may be based on one or more items and/or conditions in addition to the stated item and/or condition.

Details of one or more implementations are set forth in the accompanying drawings and in the description below. Further features, aspects, and advantages will become apparent from the description, the drawings, and the claims.

BRIEF DESCRIPTION OF THE DRAWINGS

These and other aspects will now be described in detail with reference to the following drawings.

DESCRIPTION

Figure 1:
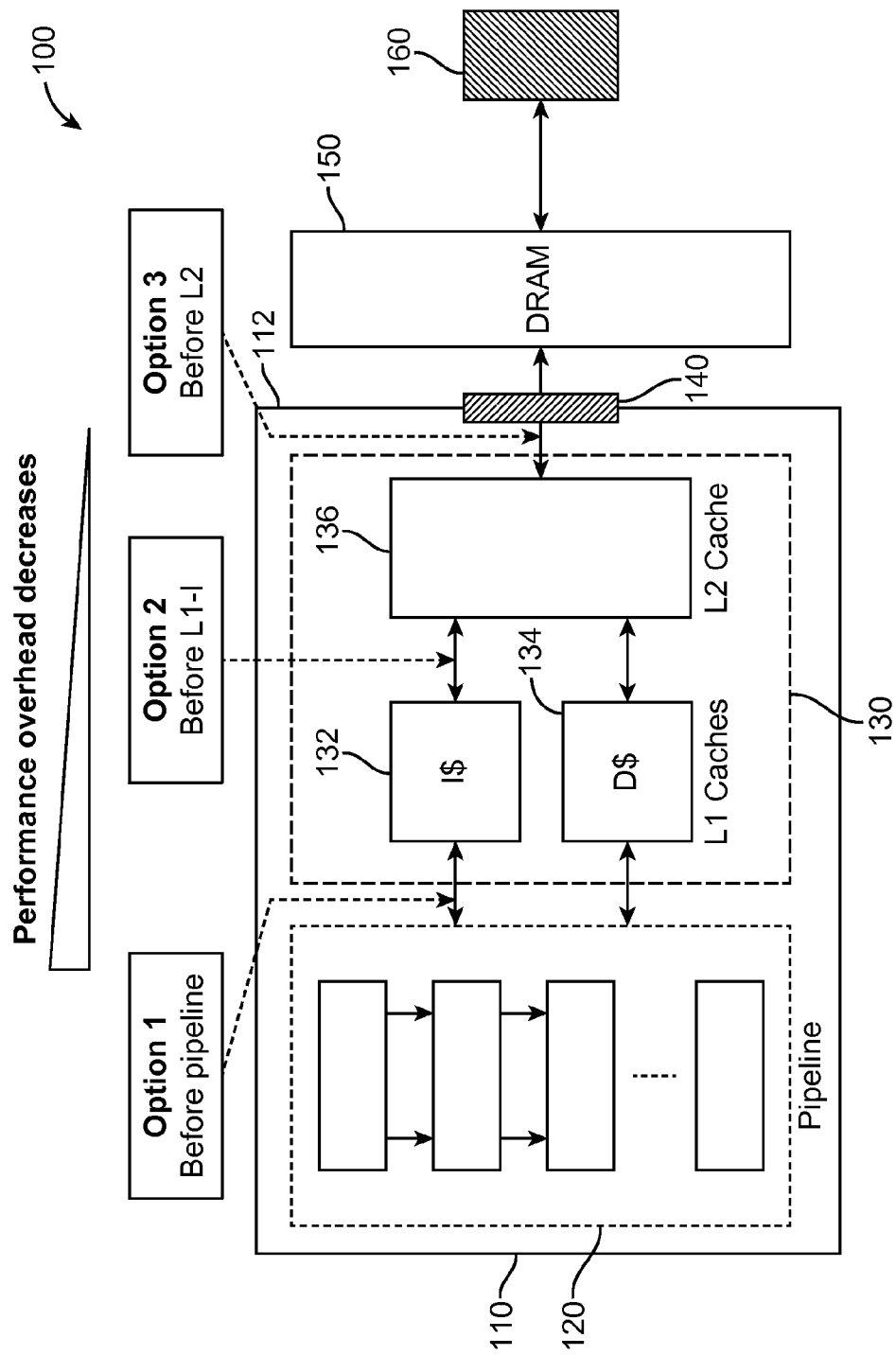
FIG. 1 is a schematic diagram of a system to implement instruction set randomization (ISR).

Described herein are systems, devices, apparatus, computer program products, and other implementations to enhance security and protection of computing systems from malware and other malicious attacks on the computing system, including a method that includes receiving a block of information from non-processor memory (e.g., DRAM) at an interface between non-processor memory and processor memory comprising two or more processor memory levels, e.g., cache with a two-level memory configuration that includes an L1 level partitioned into an instruction portion, L1-I, and a data portion, L1-D, and further includes an L2 level that is the level closest (logically) to the interface. The method also includes determining whether the block of information received from the non-processor memory at the interface corresponds to encrypted instruction code, and decrypting (e.g., a by a decryption unit employing, for example, a symmetric decryption key) the block of information at the interface between the processor non-memory and the processor memory for storage in one of the two or more levels (e.g., in the L2 level) of the processor memory in response to a determination that the received block of information corresponds to the encrypted instruction code. The block of information is stored at the one of the two or more levels of the processor memory without being decrypted when the received block of information is determined to correspond to data. As will be discussed in greater details below, in some embodiments, the method may further include associating an identifier with the received block of information, and setting the identifier to a value indicating one of instructions or data based on the determination of whether the block of information corresponds to the encrypted instruction code received from the non-processor memory. When blocks of information retrieved from the non-processor memory are tagged/identified, the method may also include determining, in response to a fetch request made by an instruction portion of another level of the two or more levels of the processor memory (e.g., the L1-I cache) for at least a portion of the block of information stored at the one of the two or more levels of the processor memory, whether the identifier associated with the block of information stored at the one of the two or more levels of the processor memory corresponds to instructions. When the identifier associated with the block of information is determined to correspond to the instructions, the at least the portion of the block of information stored at the one of the two or more levels of the processor memory is transferred to the instruction portion of the other of the two or more levels of the processor memory. When the identifier associated with the block of information is determined to correspond to data, the block of information is removed from the processor memory (i.e., the blocked is flushed from the processor memory), and the block of information is then re-read from the non-processor memory in order to perform a decryption operation on the block of information that is re-read.

The systems, methods, and other implementations described herein may be used to support instruction set diversification procedures and techniques to achieve minimal performance overhead. In some implementations, a native hardware support for diversifying systems by realizing instruction-set randomization (ISR) is provided, which aims to provide a unique random ISA for every deployed system. Software implementations are often too slow (70% to 400% slowdowns) and are generally are insecure because they use weaker encryption schemes and can be turned off. In some embodiments, to achieve instruction set randomization, different machines are assigned different encryption/decryption keys that are applied to instruction code generated for a particular instruction set architecture (ISA). By encrypting instruction code for a particular ISA with different secret keys, the benefits of having a different ISA for each individual machine/computer using the particular ISA can be emulated. As will be discussed below in greater details, a cryptographic scheme, such as AES (Advanced Encryption Standard adopted by the National Standards and Technology 2001) may be used to encrypt program binaries and decrypt the binary prior to execution by the processor. These procedures/methods for generating diversity through use of multiple different keys are simpler than actually customizing the decoder for every individual chip to implement random mappings or changing the microarchitecture machines.

Attacks typically follow the path of least resistance. Therefore, by breaking systems' homogeneity and providing diverse computing platforms, attackers are forced to develop custom exploits, thus drastically reducing their return-on-investment. In the present disclosure, only binary code-injection attack vectors, achieved via drive-by-download and social engineering attacks, are considered, but the methods, systems and other implementations described herein can be applied to other types of attack. In code-injection attacks, an attacker's goal is to lure a user into running a malicious executable, or inject code on a local application (after exploiting a software vulnerability).

In addition to the instruction sets diversification approaches disclosed herein, various contemporary defense/security mechanisms may also be employed, e.g., address space layout randomization (ASLR) and software-only diversification solutions for mitigating Return-Oriented Programming (ROP) attacks. In some embodiments, support for hardware-aided protection may be used in processors in the form of NX bits, virtualization (AMD-V, VT-x), trusted execution (Intel TXT, ARM TrustZone), etc. The solutions described herein are agnostic and orthogonal to such technologies that behave homogeneously in all deployments. However, the diversification implementations described herein can make other supplemental protection solutions used more effective by raising the bar for an attacker that studies their deployment and tries to bypass them. Instruction set diversification can thus complement other installed defense mechanisms.

In implementing the various approaches described herein, it was assumed that NX protection (e.g., Intel's eXecute Disable bit, AMD's Enhanced Virus Protection, ARM's eXecute Never bit) may not always be effective against binary code-injection attacks. It was also assumed that a trustworthy software principal (referred to as a Trust Principal), which is part of a trusted computing base (TCB), is used in order to supply and manage keys in hardware. A Trusted Principal is generally a module in the hypervisor or OS, and can supply keys to authorized processes, and manage the keys during execution (if necessary). It is also assumed that remote key transfers are done via secure channels (e.g., IPSec).

When implementing an instruction-set randomization system/method, there are three objectives that should be met: (1) for correctness, encrypted instructions should be decrypted before execution; (2) to mitigate penalties, instruction decryption should be as far away from the energy and performance critical paths in the processor; and (3) for security, the instructions should be decrypted where an adversary does not have the ability to re-write the instruction stream, and the key(s) used for encryption should be available only to authorized users. As will become apparent below, these objectives may be achieved by placing a decryption unit of an ISR system at the interface between processor memory (e.g., cache with two or more cache memory levels) and non-processor-memory (e.g., DRAM).

Thus, with reference to FIG. 1, a schematic diagram of a micro-architectural system 100 to implement instruction set randomization is shown. The system 100 comprises a processor 110 (e.g., a general-purpose processor, an application-specific controller, etc.) that includes a processing pipeline 120 for staged processing of instructions. Electrically coupled to the processing pipeline 120 is a multi-level cache 130, which in the example of FIG. 1 includes two levels, namely, L1, which is partitioned into an instruction portion L1-I cache 132 to store instruction code and a data portion L1-D cache 134 to store non-instruction data. The multi-level cache 130 depicted in FIG. 1 further includes a second level L2 cache 136 which is configured to store both instruction and non-instruction data. As noted, although the example processor 110 is depicted as including a 2-level processor memory (cache), in some implementations, the processor memory (such as the processor memory 130) may include additional levels.

As further illustrated in FIG. 1, the system 100 includes a decryption unit 140 (also referred to as a decryptor or a decryption module) that is placed at an interface (boundary) 112 between non-processor memory 150 (e.g., DRAM memory, or any other type of volatile or non-volatile computing storage device that may be a local or a remote storage device) and the outer-most processor memory level (i.e., the most remote, and possibly slowest cache memory that is accessed by the processor, with that level being accessed if there is a cache miss at a lower level of the cache memory). In some embodiments, the decryption unit 140 may comprise part of the processor 110, while in some embodiments, the decryption unit 140 may be a separate unit (e.g., not integral, modular unit) from the processor 110. As also shown in FIG. 1, there are several other placement options where the decryption unit may be positioned. For example, in placement Option 1 of FIG. 1, the decryption unit may be placed at the pipeline 120 (e.g., just before the fetch and decode stage). However, such an implementation may be energy inefficient and slow because a strong cryptographic algorithm, such as AES, would require between 20-120 cycles for decryption. While pipelining the decryption unit can mitigate some of the throughput concerns, the power and energy overheads may be significant as each instruction has to repeatedly go through the decryption unit. In placement Option 2, also depicted in FIG. 1, the decryption unit would be placed between L1-I and L2. It is to be noted that generally decryption can be performed anywhere on the processor chip as long as there is a clear distinction between instructions and data in the stream. One of the first structures in the microarchitecture where this becomes apparent is when instructions are filled from the L2cache into the L1-I cache. If the decryption unit is placed in the instruction miss fill path, the cost of decryption can be amortized due to locality available in the L1cache. Because most cache accesses hit in the L1-I cache, ISR generally adds only to the L1-I miss penalty. If the processor supports simultaneous multithreading this latency can be mitigated even further. Placing the decryption unit at the interface 112 (also marked as Option 3) between the processor memory and non-processor memory additionally mitigates the latency problem.

In some embodiments, the decryption unit 140 is realized as a hardware-based implementation that may be part of the processor 110. In some embodiments, the decryption unit may be a unit separate from the processor 110, and may be a hardware implementation, a software implementation, or a hybrid hardware/software implementation. In some embodiments, the decryption key may be assigned to decryption unit at the time of manufacture of the chip (e.g., in hardware-based implementations of the decryption unit 140), or may be assigned (and/or periodically changed) at some time subsequent to the manufacture or implementation of the decryption unit 140.

As noted, in the methods, systems, and other implementations described herein, to achieve diversification (through instruction set randomization), program instructions should be encrypted with secret keys in some fashion and decrypted before execution. In some embodiments, an encryption unit 160 may be coupled to the non-processor memory (the DRAM 150 in the example of FIG. 1), and may be configured to encrypt instruction code transferred to the non-processor memory for storage, and/or may be configured to periodically identify already stored content to apply encryption operation thereto. As also discussed below in reference to FIGS. 9 and 10, in some embodiments, encryption of instructions (and/or non-instruction data) may be performed at a remote device, e.g., a trusted server which encrypts instruction code and/or data with a secret key associated with a requesting computing device that includes the processor 110, and transfers to the requesting computing device encrypted instruction code (and/or encrypted data). In such embodiments, the receiving requesting computing device would include a communication module (e.g., wireless transceiver, a network interface, etc.) to communicate with the remote device. As with the decryption unit 140, in some embodiments, the particular encryption key may be assigned to the encryption unit 160 at the time of manufacture (thus making it more difficult to subsequently change the key post-manufacturing) or may be assigned (and be configured to be changed) at some later point of time (thus providing periodical change to the secret key(s) a particular machine is using in order to increase the difficulty of compromising the machine's/computer's security). Generally, it is desirable to use cryptographically strong encryption to prevent the attacker from guessing the ISA. To implement such a randomization scheme (i.e., use of multiple encryption/decryption keys) randomization is emulated by using different encryption keys on different devices/machines, and decrypting the encoded code at the decryption unit 140.

There are several possible ways to implement an encryption/decryption mechanism for each machine/device that offer a spectrum of diversity versus complexity tradeoffs. In some embodiments, randomization can be obtained by applying encryption for different message lengths, which correspond to different granularities of encrypted code. There are several possible approaches to implement encryption:

1) One key for the entire system—A simple implementation approach is to encrypt all software (and firmware) on the system with the same key (which would also be available for decrypting instruction code). Without the key, an attacker's binary code (the malicious payload) will be decoded as a garbled sequence of instructions, and will not behave as the attacker intended. One problem of such an approach is the excessive amount of trust put on the system-wide secret key. If the key is leaked and becomes known to the attacker, the one-key implementation will become ineffective from a security point of view.

2) One key per privilege level—Another approach to implement encryption is to use one key per privilege level, with the appropriate key provided by the hardware upon privilege level changes. Here too, a leaked key will result in software of the active privilege level being compromised, and thus a new encryption key would need to be installed. Under this approach, it is important to ensure that installation of a new key in the hardware cannot be initiated at the various privilege levels (to prevent use of a stolen key for some privilege level to achieve unauthorized resetting of any of the keys).

3) One key per process—This approach provides a strong degree of protection against key leaks. Particularly, a leaked key for one application does not put another application in danger. However, such an approach complicates software implementation in several ways. First, some trusted entity has to store and manage keys for potentially a very large number of applications. Additionally, the software component would need to operate at the operating system (OS) level, because the process abstraction is not readily available below the OS, and as such it will be inherently vulnerable to OS kernel vulnerabilities and attacks. Another problem with this approach is that it breaks code-sharing among applications. Thus, shared code regions, like libraries, will have to be encrypted under different keys. One simple workaround would be to statically compile all binaries.

4) One key per executable package—Under this approach, each package containing executable code (including shared libraries) is encrypted with different keys. Consequently, a running process might have multiple static and dynamically loaded code modules (corresponding to the executable and the shared libraries) in its address space, each encrypted with a different key. This approach has a similar order of key complexity as the "one-key-per-process" approach, except that now sharing common memory is possible at the granularity of executable modules, allowing the use of shared libraries as usual.

5) One key per page—In this approach, each memory page, even within the same executable or library, is allowed to have different encryption keys. This is similar to and compatible with the "one-key-per-executable-package" approach. However, this approach provides more diversity than the per-executable keys, since by knowing one key or figuring out a valid opcode, an attacker is limited to code injection within the respective memory page.

6) Smaller granularities—Code encryption in the methods, systems, and implementations described herein may also be implemented with even smaller encryption granularities (encryption at levels such as functions, basic blocks, cache block width, instruction-level, etc.) This could provide enormous diversity, but with a resultant overhead complexity that may make any such encryption granularity too high to be practical.

Thus, a particular machine (e.g., a computing device such as the system 100 of FIG. 1) may be configured to employ multiple encryption keys, based on the desired diversity and complexity required, and the decryption unit (such as the unit 140) would then be configured to apply decryption based on those encryption keys and encryption approaches implemented for the encryption unit. As noted, the particular key(s) used by one particular machine may, in some embodiments, be different from the key(s) used by another machine in order to emulate instruction set randomization, and thus provide diversity through which machines/devices are rendered less vulnerable to attacks by rogue parties. As will be discussed in greater details below, two approaches that were used during testing and experimentations performed for the methods, systems, and other implementations described herein included the one-key-per-system approach and the one-key-per-page approach.

A further implementation choice for the encryption/decryption mechanism employed by a particular machine or device is the key storage implementation, specifically, where to store, for example, decryption keys. Generally, in implementations based on symmetric AES keys (e.g., AES keys with 128 bits), the keys are stored in hardware. When using the one-key-per system approach (also referred as "System ISR") which requires a single key, the key can be stored at the decryption unit itself because the key will generally not be modified (at least during normal operation). On the other hand, when using the one-key-per-page approach (also referred to as "Page ISR"), a logical place to hold the per-page AES keys (and a corresponding initialization vector, or IV, if required) is the Instruction Translation Lookaside Buffer (ITLB). On a page fault, the key corresponding to an encrypted page is installed into the ITLB SRAM (with or without OS assistance) as part of the fault handling mechanism. Subsequently, every time an instruction miss request is sent out the page keys are also read from the ITLB and sent out as part of the miss request so that the blocks can be unencrypted at the appropriate level.

Another implementation choice for encryption/decryption mechanisms is the encryption mode to be used. Although any type of cipher may be used (e.g., symmetric, asymmetric), in the implementations that were tested and evaluated, symmetric ciphers were chosen instead of asymmetric ones for encryption, in part because asymmetric ciphers are generally more expensive than symmetric ones. As noted, an example symmetric cipher is the AES cipher, but any other cipher type may be used instead.

Symmetric block ciphers can be used in a number of modes. An important requirement for the systems, methods, and other implementations described herein is that decryption of any random block in a message should not depend on any other block. This property of random access should be used since the decryption of blocks should be independent of other blocks. If this were not so, all required blocks would have to be made available to the decryption accelerator at once by fetching them from cache or memory, which will not only increase decryption latency but also pollute the cache. This requirement means that, in some embodiments, CBC (cipher-block chaining), CFB (cipher feedback) and OFB (output feedback) cipher modes would not be used. Additionally, to achieve stronger security, it is preferable not to use ECB (electronic codebook) mode since encryption using this mode is prone to dictionary and block-reuse attacks.

Figure 2:
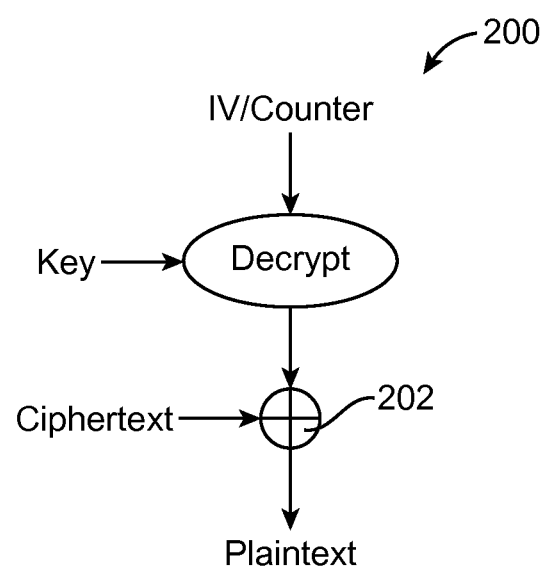
FIG. 2 is a diagram of a decryption counter mode cipher implementation.

In some embodiments, a cipher mode that may be used for the systems, methods, and other implementations described herein is counter-mode ciphering. In this mode, a keystream block is generated by encrypting successive values of a counter that provides distinct outputs (at least during a particular period of time) so that each message block uses a unique counter value (else dictionary attacks can be mounted across ciphertext messages that use the same key and counter). FIG. 2 is a diagram of a decryption counter mode cipher implementation 200, in which in the decryption operations are performed with an encryption/decryption key and an initialization vector (IV) which may be used as a counter seed for encryption/decryption of a message block (the same IV would need to be used for encryption as well as decryption, but does not necessarily need to be kept secret). As depicted in FIG. 2, the decryption implementation 200 (which may be similar to the decryption unit 140 of FIG. 1) produces output based on the decryption key (which for symmetric ciphers may be the same as, or a function of, the encryption key), and the IV and/or the counter value it receives, and combines that resultant output with the ciphertext (using a combiner 202) to generate the plaintext. In some embodiments, the combining operation may be implemented as a XOR operation. Thus, in the counter mode, decryption is not performed on the ciphertext but on the counter. This provides simultaneous block fetch and decryption, assuming: (a) the appropriate counter value is known at request initiation, and (b) XOR operation on the block takes few, if any, cycles. There is, therefore, a performance overhead only when the decryption process takes longer than the fetch from the next stage, and if so, the overhead is determined according to the relationship (decryption latency)-(fetch latency) cycles. This implies that in the methods, systems, and other implementations described herein, in which decryption is performed at the processor memory and non-processor memory interface, there may be no overhead at all if decryption latency is less than memory fetch latency (which is generally the case).

In circumstances where counter mode (requiring an initialization vector, IV) is used in conjunction with symmetric encryption/decryption processing, there are some additional implementation choices that can be made. Particularly, when Page ISR is used (where each code page of an application is encrypted with a unique key), in some implementations, for each code block in a page the counter may be the block offset in the page. One advantage of such a scheme is that, because the counter can be inferred from the virtual/physical address, the IVs need not be stored. In embodiments in which System ISR is implemented (where there is one key for the entire system), secure counter mode requires a unique counter for every code block. One way of achieving this is by assigning every package a unique ID in the range $[1, 2^{73}]$. The IV for each code page in a package may be the concatenation of the package ID and the absolute address of the page in the package. The actual counter may be derived as a concatenation of the IV and the page offset of the block. If one does not wish to maintain package ID, a simple implementation choice for System ISR is to use a constant IV for the entire system. This lowers the security in that in such an implementation, for a given key, the plaintext-ciphertext mapping remains constant. One could, thus, reuse code chunks with other code chunks from the same system without needing to know the key. Even so, all programs that wish to run on a system have to come from a trusted source which encrypts the binaries on the system, so this may not be an acceptable security choice in many situations. The vulnerability of this scheme is same as ECB mode, but with the performance advantages of CTR mode encryption, and implementation simplicity of system ISR mode. In the implementation choices discussed herein, simultaneous fetch and decryption can be provided either by storing the IV for each page in the ITLB along with the key, inferring it (in hardware) from some page characteristic, or a combination of both.

In some embodiments, an implementation for encryption keys, e.g., during handling instruction page faults, may be provided. As noted, code pages may be encrypted using symmetric keys (e.g., AES keys). To further protect coded pages retrieved from non-processor memory and into cache, a symmetric key used to encrypt a particular code page may be encrypted using a public key of a private-public encryption key pair associated with the particular processor/machine that is to execute the instructions in the code page (different processors will have different private-public key pairs). The private key is stored on the chip itself and is neither visible nor accessible to any entity. As the encrypted symmetric key(s) for a code page is fetched into the processor, the key(s) is decrypted using the private key of the processor to thus yield the decrypted (plaintext) symmetric key required to decrypt the encrypted code page.

Thus, in such embodiments, decrypting the block of information corresponding to the encrypted instruction code at the interface between the processor-memory and the non-processor memory may include retrieving from the non-processor memory one or more symmetric keys, encrypted using a public key of a private-public key pair for a processor, associated with a code page, and deriving the one or more symmetric keys from the encrypted one or more symmetric keys using a private key of the private-public key pair for the processor. Retrieving the one or more symmetric keys may include retrieving the encrypted one or more symmetric keys during page-fault-processing to retrieve into the non-processor memory the code page. Deriving the one or more symmetric keys may include deriving from the encrypted one or more symmetric keys one or more AES keys.

As discussed herein, symmetric keys may be associated with every code page. Thus, it may be convenient to fetch keys for a particular page while processing a corresponding fault for a code page. To do so, the last-level page table entries (PTEs) for code pages should be in a special format. For example, the PTE may include an asymmetrically encrypted key for the page followed by the actual translation.

One implementation challenge is that because ISR PTEs are longer than a word, the traditional process of offset-based PTE fetching does not work. In some embodiments, this challenge can be overcome by extending the original page walk scheme by one more level of indirection. Instead of storing the physical address of another table to offset into, the actual physical address of the ISR PTE may be stored at the penultimate level. For example, reserved value in SPARC MMU specifications may be used in the type field of a PTE to indicate an ISRized page. This implementation allows the OS to arrange these entries in memory in whichever way it deems convenient, either as a table, or as discrete entries in memory. Hardware is agnostic to this organization.

Upon a page fault, the origin of the fault (e.g., DTLB or ITLB) determines whether a code or a data page is expected. For a code page fault, the table walk proceeds as usual until an entry with the ISR type is encountered. This indicates to the MMU (memory management unit) that the next level is an ISR PTE. The walk mechanism procures the key and translation from the physical address found at the next level. The key is then fed to an on-chip ECC module, whose result is then fed into a key-derivation module to obtain the AES key of the particular page. At this point, both AES key and translation are stored in the ITLB. If an ISR page is encountered on a data-page walk, the key is ignored and only the translation is forwarded to the DTLB. If an invalid entry is found during the walk instead, the page fault handler in the OS is invoked. The OS is then responsible for setting up the tables in a manner expected by the system (software- and/or hardware-realized system).

Whereas code faults involve an ISR PTE, data faults involve both ISR and normal PTEs. In this way, data and code can effectively be allowed to exist in the same page. However to allow correct decryption, care must be taken to either align data and code to be at cache block width, or, if they exist within the same line, the data is immutable. This can be done either by the compiler or the user (using the align keyword in gcc, for instance). This implementation also has the side effect that code can be treated as regular data, i.e., it can be read and written to. This may be allowed because all code is generally encrypted anyway, and the keys are secret. An alternate implementation choice may be to strictly segregate code and data at page granularity, e.g., by allowing only ISR PTEs for code and normal PTEs for data. Although this may be a more secure option, this might be more limiting in terms of convenience of development, deployability, and practicality (e.g., when space is an issue).

Because the above-described scheme may be integrated with page-walking, a simple and inexpensive extension to the implementation is to provide encryption at two non-page granularities determined by the walk-level at which the PTE is encountered may be made. In typical page-tables, the level determines the memory region covered by the PTE. In SPARC32 specifications, a level-3 PTE covers 4 kB, level-2 covers 256 kB, while level-1 covers 16 MB. This simple optimization allows a single key to be associated with these memory granularities depending on which level the PTE exists at. This is useful in mapping large regions of code, without using up a lot of space for keys. This may be particularly useful while mapping the kernel's own page tables, especially when set up by the bootloader.

In example implementations that were tested and evaluated, an AES-128 key for symmetric encryption, an ECC-160 key (based on elliptic curve approach) for asymmetric encryption, and an ECC Integrated Encryption Scheme (where the symmetric key was derived from the public key using SHA-256 as the key derivation function (KDF)) were used. ECC was used in some of the implementations described herein (e.g., instead of the popular RSA asymmetric scheme) because ECC has shorter key lengths and, consequently, shorter encryption/decryption latencies. A critical implementation requirement with counter mode of block encryption is that the scheme is secure if the counter is not repeated for the same key. The counter itself need not be kept secret as long as the key is secret. It is to be noted that asymmetric decryption has been inserted into the critical path of a code-page fault resolution. While this latency overhead is non-trivial, code page faults are generally not common, and thus the associated overhead cost is manageable.

With continued reference to FIG. 1, when the decryption unit 140 is positioned at the interface 112 (as depicted in FIG. 1), an implementation difficulty that arises is that higher-level processor memory have to determine whether a block that is to be retrieved from the non-processor memory should be processed as a block of instruction code (so that it can be decrypted) or as non-instruction data (in which case the block is not, in some embodiments, decrypted). In some implementations, this problem is resolved by determining the nature of the requested information block at the microarchitectural level. The originating source (instruction or non-instruction data) of a cache miss requiring a call to non-processor memory is preserved all the way to the memory controller to identify instruction or data miss requests. When a miss reply comes in from non-processor memory (e.g., DRAM), decryption operations are selectively applied to instruction fills. Upon a determination that an instruction block retrieved from the non-processor memory was retrieved as a result of a cache miss corresponding to instructions code (e.g., the cache miss originated from a cache portion corresponding to instruction code, like the L1-I cache), the block of information retrieved from the non-processor memory is decrypted, e.g., by the decryption unit 140 in the example system 100 of FIG. 1, and the decrypted block of information is filled into the high level cache memory. This way, the decrypted instructions remain decrypted in the lower levels (L2 and L1), where most of the accesses hit, significantly reducing the penalty of ISR.

More particularly, when a cache miss occurs after a lower level request (e.g., from the L1 level in the example of FIG. 1) is received by the higher level cache (e.g., L2), and the higher level cache has to issue a request to the non-processor memory to obtain the required block of information, the point of origin (i.e., the source) from which the request received by the higher level cache is known. For example, when the L2 cache receives a request from the L1-I cache portion, it is known that in the event that the requested block is not in the L2 cache and a request needs to be sent to the non-processor memory, the block of information to arrive from the non-processor memory will correspond to instruction code, and thus will require (in the implementations described herein) decryption by the decryption unit 140. Conversely, when a request is received at the L2 cache from the L1-D cache portion, and the requested block is not available at the L2 cache, the block of information that will be retrieved from non-processor memory as a result of a consequential cache miss at the L2 cache will correspond to data (i.e., non-instruction data). Accordingly, in some embodiments, determining whether the block of information received from the non-processor memory at the interface between non-processor and processor memory corresponds to encrypted instruction code or to non-instruction data includes determining whether the block of information received from the non-processor memory at the interface corresponds to encrypted instruction code based on a request sent from the processor for the block of information. The block of information received from the non-processor memory may be determined to correspond to encrypted instruction code comprises when the request for the block of information is associated with a portion of the processor-memory configured to store instructions (e.g., the L1-I cache portion).

In the embodiments described herein, the decryption implemented at the boundary/interface between a multi-level processor memory configuration and non-processor memory creates a security vulnerability. Suppose a cache block was fetched from DRAM into the L2 processor memory level in response to a data (i.e., non-instruction) load request. Consequently, the retrieved block, requested as non-instruction data, is not decrypted by the decryption unit, and thus is stored into the high-level processor memory (e.g., the L2 level in the example of FIG. 1) as non-decrypted data. Suppose now that this retrieved non-instruction (and non-decrypted) data is also requested by the L1-I portion of the cache. In this scenario, the block, which came in as data without going through a decryption process, may be fed as-is to the L1-I cache portion and eventually may make its way into the pipeline, thus completely bypassing ISR. An attack vector to exploit this vulnerability might involve first loading the shell-code, crafted in native ISA, as data, and referencing the same locations for execution soon thereafter while that retrieved pernicious block of information is still in L2. Conversely, consider the case when a block that resides in L2 is fetched as an L1-I fill, i.e., as an instruction, but is eventually requested by the L1-D. The decrypted instruction (in a form which can be easily disassembled) is now being treated as data. In such a scenario, a well-crafted attack can be based on decrypted instructions from known locations. Given the location and the decrypted instruction, a reliable dictionary of instruction mapping could be constructed that can be used to construct valid pieces of ISRized code.

Therefore, in some implementations, to prevent such attack attempts, instructions and data cache blocks are tracked in all caches levels. Tracking of information blocks placed within processor memory may be performed by adding a bit to each cache block indicating whether it is instruction or data. This bit is set by tracking the first source of the miss, i.e., the instruction or the data cache. Thereafter, only blocks marked as instruction can subsequently be fed to the L1-I cache, and vice versa for data. Cross-sharing between the split caches is thus disallowed, either directly or through higher level cache memory (e.g., the L2 cache in the example of FIG. 1). Thus, in some embodiments, the processes implemented by the systems described herein include associating an identifier with the received block of information, and setting the identifier to a value indicating one of instructions or data based on the determination of whether the block of information corresponds to encrypted instruction code received from the non-processor memory.

With the blocks of information stored in the processor memory being identified (e.g., as instruction or non-instruction data), when the L2 cache level receives a request from the L1-I for a block marked data, that block has to be flushed from the processor memory and fetched again, this time going through the decryption process. Similarly, when a block marked instruction is requested as data, it is flushed and fetched again, only now the decryption module will be bypassed during the higher-level cache (e.g.,L2) fill. Thus, in some embodiments, processes implemented by the systems and other implementations described herein include determining (e.g., by the processor 110, or, alternatively, by the decryption unit 140, or by some control circuitry to control the decryption unit 140 and/or the processor 110), in response to a fetch request made by an instruction portion of a lower level of the multi-level processor memory for at least a portion of the block of information stored at a higher level of the multi-level processor memory, whether the identifier associated with the block of information stored at the higher level of the processor memory corresponds to instructions. Based on this determination, one of two procedures is performed. Specifically, the at least the portion of the block of information stored at the higher level of the processor memory is transferred to the instruction portion of the lower level of the processor memory when the identifier associated with the block of information is determined to correspond to the instructions. However, when the identifier associated with the block of information is determined to correspond to data (but the fetch request, as noted, was made by a portion of the cache dedicated to instructions), the block of information is removed (flushed) from the processor memory, and is retrieved again from the non-processor memory in order to perform a decryption operation on it.

In a similar manner, processes implemented by the systems and other implementations described herein may include determining (e.g., by the processor 110, or, alternatively, by the decryption unit 140, or by some control circuitry to control the decryption unit 140 and/or the processor 110), in response to a fetch request made by a data portion of a lower level of the multi-levels processor memory for at least a portion of the block of information stored at a higher level of the multi-level processor memory, whether the identifier associated with the block of information stored at the higher level of the processor memory corresponds to data. Based on this determination, one of two procedures may be performed. Specifically, the at least the portion of the block of information stored at the higher level of the processor memory may be transferred to the data portion of the lower level of the multi-level processor memory when the identifier associated with the block of information indicates that the block of information corresponds to the data. On the other hand, when the identifier associated with the block of information is determined to correspond to instruction code (but the fetch request, as noted, was made by a portion of the cache dedicated to non-instructions), the block of information is removed from the processor memory, and the block of information is retrieved again from the non-processor memory in order to be transferred into the processor memory without being decrypted.

Figure 3:
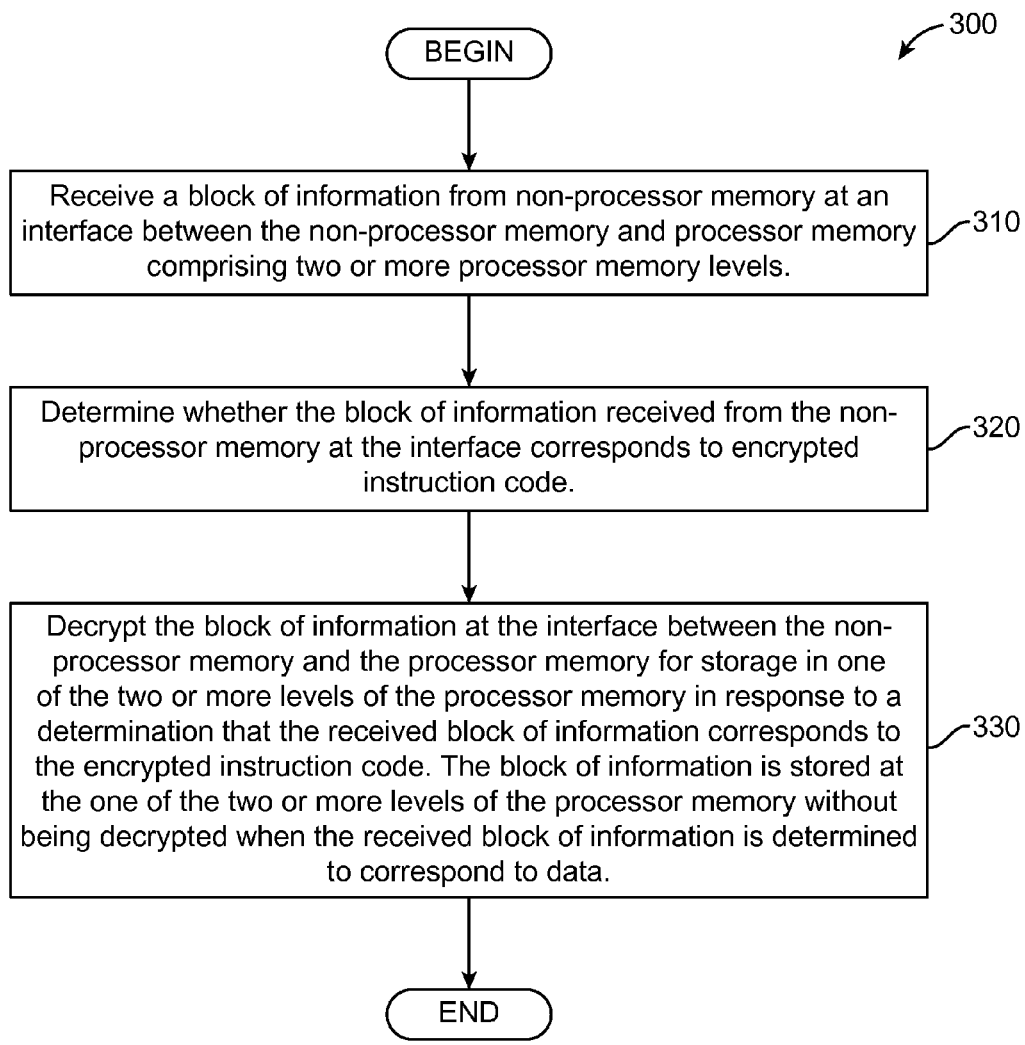
FIG. 3 is a flowchart of an example procedure for instruction set randomization.

With reference now to FIG. 3, a flowchart of an example procedure 300 to implement instruction set randomization is shown. As described herein, in some embodiments, instruction set diversification is achieved through instruction set randomization (ISR) implemented through use of different encryption keys with different devices that may otherwise have the same instruction set architecture. By employing different encryption keys (any type of key may be used, including symmetrical, or asymmetrical keys), instruction set diversification can be emulated. The procedure 300 includes receiving 310 a block of information from non-processor memory (e.g., DRAM) at an interface between the non-processor memory and processor memory comprising two or more processor memory levels. e.g., a cache with 2 levels, where the lowest level (which is farthest from the interface, and closest to the processor's pipeline) may be divided into an instruction portion (e.g., L1-I) to store instructions and a data portion (L1-D) to store data (e.g., non-instruction data).

Having received the block of information, a determination is made 320 whether the block of information received from the non-processor memory at the interface corresponds to encrypted instruction code. As noted, this determination may be based on the origin of the cache request that resulted in the block of information being retrieved (fetched) from the non-processor memory. For example, if the request for the block of information originated from a portion of the cache memory dedicated to instructions (e.g., from the L1-I cache portion), then the retrieved block of information responsive to the request is deemed to correspond to instruction code.

The received block of information is decrypted 330 at the interface between the processor-memory and the non-processor memory (e.g., at the interface 112 depicted in the example system 100 of FIG. 1) for storage in one of the two or more levels of the processor memory in response to a determination that the received block of information corresponds to the encrypted instruction code. Thus, if it is determined (e.g., at 320 of FIG. 3) that the received block of information corresponds to encrypted instruction code, the block of information is decrypted. The block of information is stored at the one of the two or more levels of the processor memory without being decrypted when the received block of information is determined to correspond to data. In some embodiments, decrypting the block of information corresponding to the encrypted instruction code includes decrypting the encrypted instruction code with one or more first keys assigned to the present controller device (e.g., computing device) on which the procedure 300 is performed. The one or more first keys used to decrypt instruction code on the present processor may be different from at least one key assigned to a second, different, controller device (e.g., some other computing device) that is associated with the same particular instruction set architecture as the present controller device. As noted, the use of different keys for different devices achieves instruction set diversification without having to use different instruction set architecture for different individual devices. In some embodiments, the decryption process implemented by the decryption unit of the present device (and, by extension, an encryption unit coupled to, and/or in communication with, the same device) is based on use of one or more symmetric keys (e.g., AES keys) according to a counter mode encryption/decryption process. The encryption/decryption processing may be performed according to System ISR (i.e., one key for the entire system), page ISR (i.e., different keys for different memory pages), or according to any other encryption granularity scheme.

As also noted, to avoid attempts to circumvent the encryption/decryption-based security mechanism described herein by causing a block of information containing malicious instructions to be identified as non-instruction data at the time of processing by the decryption unit in order to subsequently use that block of information as instruction data, in some embodiments, block of information stored in the processor memory may be tagged or identified as 'instruction' or 'data.' When a block identified as 'data' is subsequently requested and fetched by a lower level cache to be used as instruction (e.g., by the L1-I portion 132 of the system 100 shown in FIG. 1), then the requested block of information is first removed (flushed) from the processor memory, and is retrieved again from the non-processor memory (which may be a storage device located locally or remotely) in order to perform a decryption operation on the block of information retrieved again. If the block of information is identified as 'instruction' and is in fact requested by a portion of the cache corresponding to instruction storage, the block of information is transferred to the requesting portion of the cache.

Figure 4:
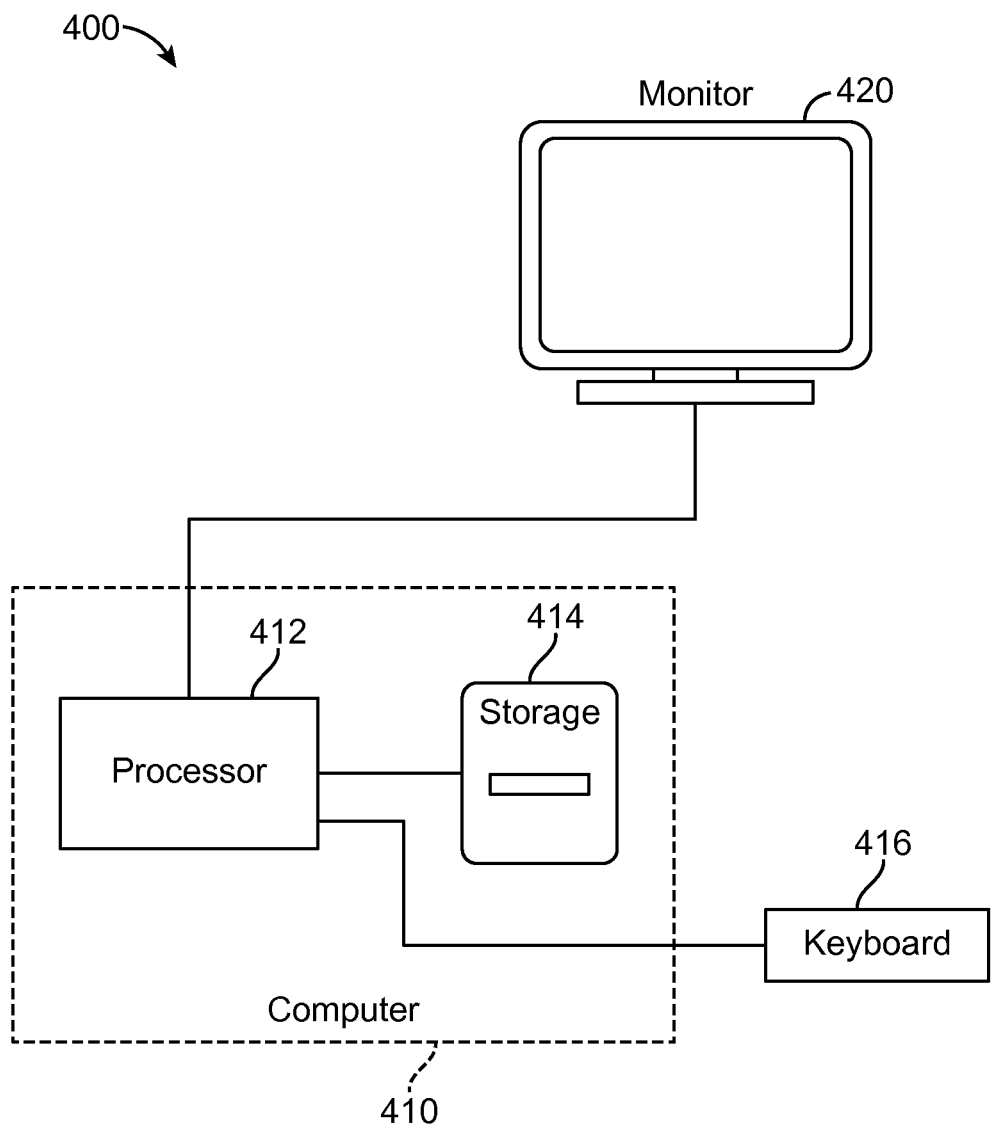
FIG. 4 is a schematic diagram of a generic computing system.

Performing at least some of the operations described herein may be facilitated by a processor-based computing system. Particularly, at least some of the various devices/systems/units described herein may be implemented, at least in part, using one or more processor-based devices. With reference to FIG. 4, a schematic diagram of a generic computing system 400 is shown. The computing system 400 includes a processor-based device 410 such as a personal computer, a specialized computing device, and so forth, that typically includes a central processor unit 412 (which may be similar to, and/or be configured to perform operations similar to those performed by, the processor 110 depicted in FIG. 1). In addition to the CPU 412, the system includes main memory, cache memory and bus interface circuits (not shown in FIG. 4). As described herein, in some embodiments, coupled to the CPU 412 may be a decryption unit configured to decrypt (e.g., according to one or more pre-assigned symmetric keys) blocks of information received from non-processor memory based on a determination of whether the received blocks of information correspond to encrypted instruction code or to non-instruction data. The processor-based device 410 may include a mass storage element 414, such as a hard drive or flash drive associated with the computer system. The computing system 400 may further include a keyboard, or keypad, or some other user input interface 416, and a monitor 420, e.g., a CRT (cathode ray tube) or LCD (liquid crystal display) monitor, that may be placed where a user can access them.

The processor-based device 410 is configured to perform at least some of the operations/procedures described herein. The storage device 414 may thus include a computer program product that when executed on the processor-based device 410 causes the processor-based device to perform operations/procedures described herein. The processor-based device may further include peripheral devices to provide input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to provide general operation of the respective system/device. Alternatively and/or additionally, in some embodiments, special purpose logic circuitry, e.g., an FPGA (field programmable gate array), an ASIC (application-specific integrated circuit), a DSP processor, etc., may be used in the implementation of the system 400. Other modules that may be included with the processor-based device 410 are speakers, a sound card, a pointing device, e.g., a mouse or a trackball, by which the user can provide input to the computing system 400. The processor-based device 410 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Some or all of the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an embodiment of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server generally arises by virtue of computer programs running on the respective computers and having a client-server relationship to each other.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figures 5, 6:
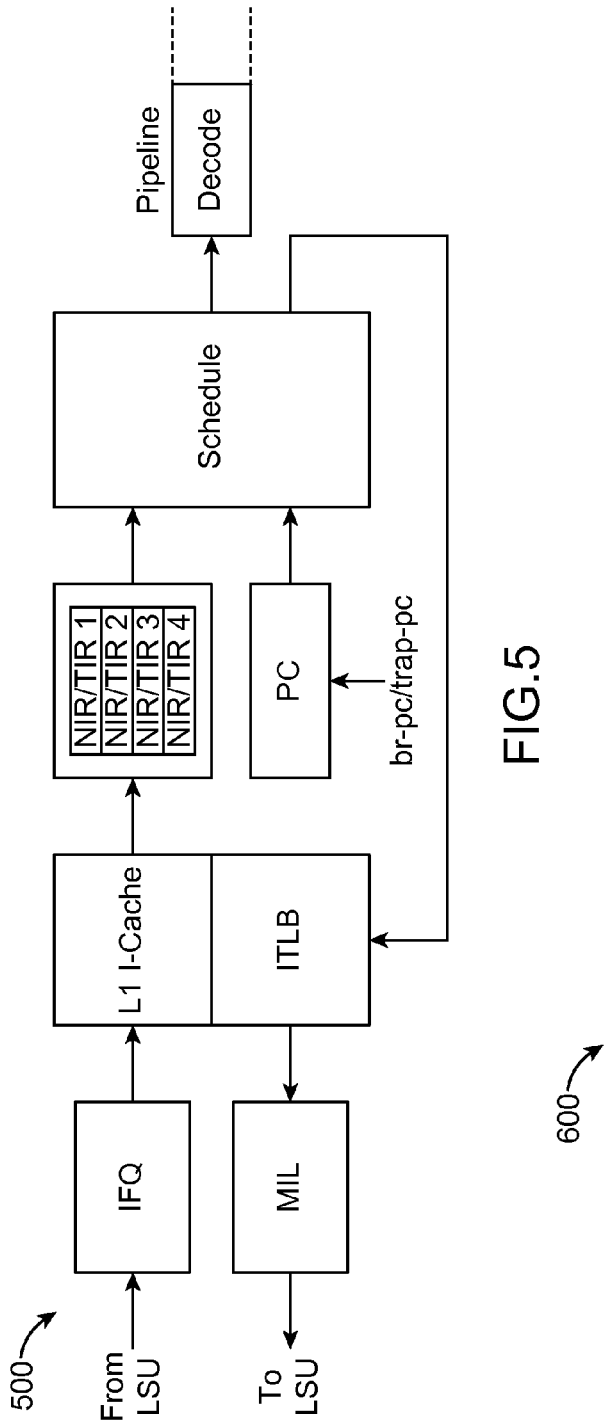
FIG. 5 is a diagram showing a portion of an Instruction Fetch Unit (IFU) at the front-end of the execution pipeline.
FIG. 6 includes a table listing common architecture parameters used for the simulations of the implementations described herein.

In order to allow development of software and to test and evaluate at least some of the features of instruction set randomization (including encryption/decryption schemes), the following system to support ISR was realized (the system was realized mostly based on a software simulation, although some portions were implemented in hardware as well). An OpenSPARCT1 microprocessor core was used to implement hardware support for ISR. The OpenSPARC core was supported by the Xilinx XUPV5-LX110T FPGA development board, which provided characterization of the system on live hardware without emulation. In the tested/evaluated implementation, the decryption module was placed below the L1-I memory interface (because, for this implementation, the FPGA does not have a multi-level cache). The Sun OpenSPARCT1 microprocessor is an open source variant of the Sun UltraSPARC T1 RISC architecture with its Verilog source available for free. It is a 64-bit processor and supports chip multi-threading (4 per core). The core SPARC pipeline includes six (6) stages and is part of the instruction fetch unit (IFU), which is responsible for maintaining instruction flow through the pipeline by controlling the modules feeding it. FIG. 5 shows a portion 500 of IFU at the front-end of the execution pipeline. Four pairs of addresses are maintained for each thread, which correspond to the current PC (in the thread instruction register, or TIR) and the next PC (in the next instruction register, NIR) for four threads co-located at each core. Alternatively, the next address can also be determined based on an evaluated branch or interrupt. Once the next address has been determined, it is fetched from the L1-I cache which is coupled with a standard ITLB for faster address translation. Addresses that miss in the L1 -I are stored in a missed instruction list (MIL) and eventually fed into the load-store unit, which is responsible for servicing misses. The retrieved instruction blocks are collected in the instruction fetch queue (IFQ) which fills the cache.

For a single-key ISR used in ECB mode, the key may be stored in some non-volatile memory, from where it can be loaded onto a register on boot time. This register can then be used to supply the key to the decryption unit for rest of system up-time. In the OpenSPARC implementation, the key was hard-coded at design time and was not made programmable. The key was used to decrypt the cache lines when they were filled into the L1.

In some of the tested embodiments, the decryption core was placed between the L1-I and L2 caches where it was configured to decrypt a full cache line of data as it came in from L2 using the key previously stored in the MIL at the time of L2 request generation (this also provided implementation of a more complex cipher such as AES for enhanced security). The placement of the encryption core allows significant latency hiding, so a high-complexity procedure generally only minimally affects overall system performance.

The encryption key data (stored in the OS) is brought into the ITLB on a page fault by the miss handler of the OS or hypervisor. Stores are used to alternate address spaces to perform key writes. The alternate space 0x54, already supported in hardware, is used to write ITLB physical address data. At all the places where the miss handler already uses the STXA (store eXtended word to alternate address space) instruction to write ITLB physical address data, similar instructions are added to store key data in the same entry.

In some of the embodiments tested, instructions were decrypted as they were brought into L1-I from L2. This allowed for significant latency hiding, as the majority of instruction requests were serviced from the plaintext copy in L1-I and did not require decryption. The ITLB was augmented with a key storage memory structure that sits next to the physical address data memory. It is, therefore, easy to access the keys because when a memory translation in the ITLB is accessed, the corresponding key is used to decrypt the instruction at the particular address. Keys are brought into this structure on an ITLB miss by the miss handling mechanism operated by the OS/hypervisor. The missed instruction list (MIL) contains pending instruction requests that missed in L1-I and have been sent further out in the memory hierarchy for fulfillment. Each MIL structure was modified to add key storage, with enough space to store one full key per missed instruction. Key data was brought in from the ITLB at the same time as physical address data and the key in the corresponding MIL entry was used to decrypt the block before sending it on to the L1-I.

Aside from the crypto accelerator that had approximately 2500 lines of Verilog code, System ISR required less than 5 lines of Verilog code of the OpenSPARC processor. Implementing Page ISR in hardware was slightly more complex. Even so, only approximately 500 lines of Verilog code (a portion of which was wire-forwarding among different modules) needed to be added/modified. It is to be noted that even minimal changes in hardware code can allow very strong protections for software systems that have billions of lines of vulnerable code, thus validating an approach of using hardware-enhanced security to protect against attacks.

The impact that the placement choice of the decryption unit (e.g., at the interface between processor and non-processor memory, between L1 and L2 cache level, or just before the processing pipe line) has on performance of the methods, systems, and other implementations described herein was tested and evaluated. As will be further discussed below, the testing and evaluation showed that even using strong and expensive encryption standard such as AES for security can be done with negligible overhead.

To further test and evaluate the impact the decryption unit placement has on performance, a gem5 simulator (a commonly used modular platform for computer system architecture research) was modified to simulate extra hit latencies corresponding to various implementation points. FIG. 6 includes a table 600 providing the common architecture parameters used for the simulations. The simulator itself was run in system-call emulation mode with a SimpleTiming-CPU. To simulate latency corresponding to an AES decryption, 40 cycles were added (which is the latency of the AES core implemented) to the stage at which it is be to placed. For instance, for a decryption unit placed between the L1-I and the L2 caches, if the original hit latency in L2 for requests from L1-I is 100 cycles, the new hit latency became 140 cycles. The miss latency is increased by an equal amount as well. For the experiments conducted, the benchmarks from the SPEC CPU2006 benchmarks suite were used. These benchmarks were run to completion with the test input set. These benchmarks were chosen because they were the only ones in the SPEC CPU2006 suite that ran without functional-emulation errors on the ALPHA/gem5 emulator in syscall mode.

Figure 7:
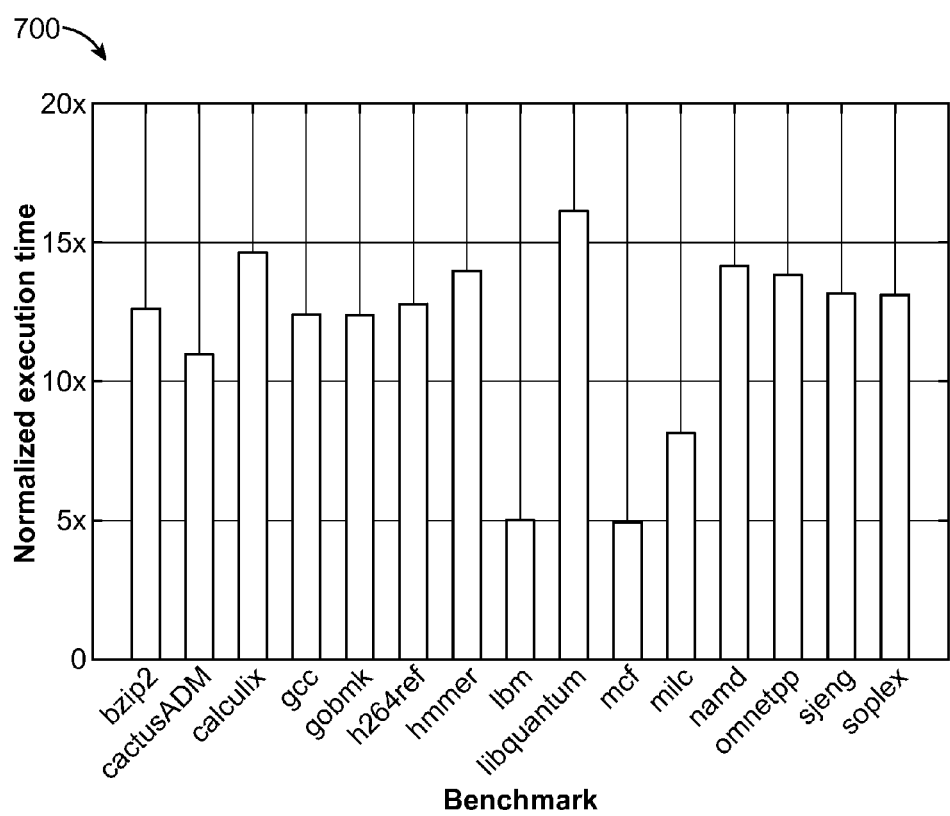
FIGS. 7 and 8 are graphs showing performance results for an instruction set randomization system with different placement choices for a decryption unit.
Figure 8:
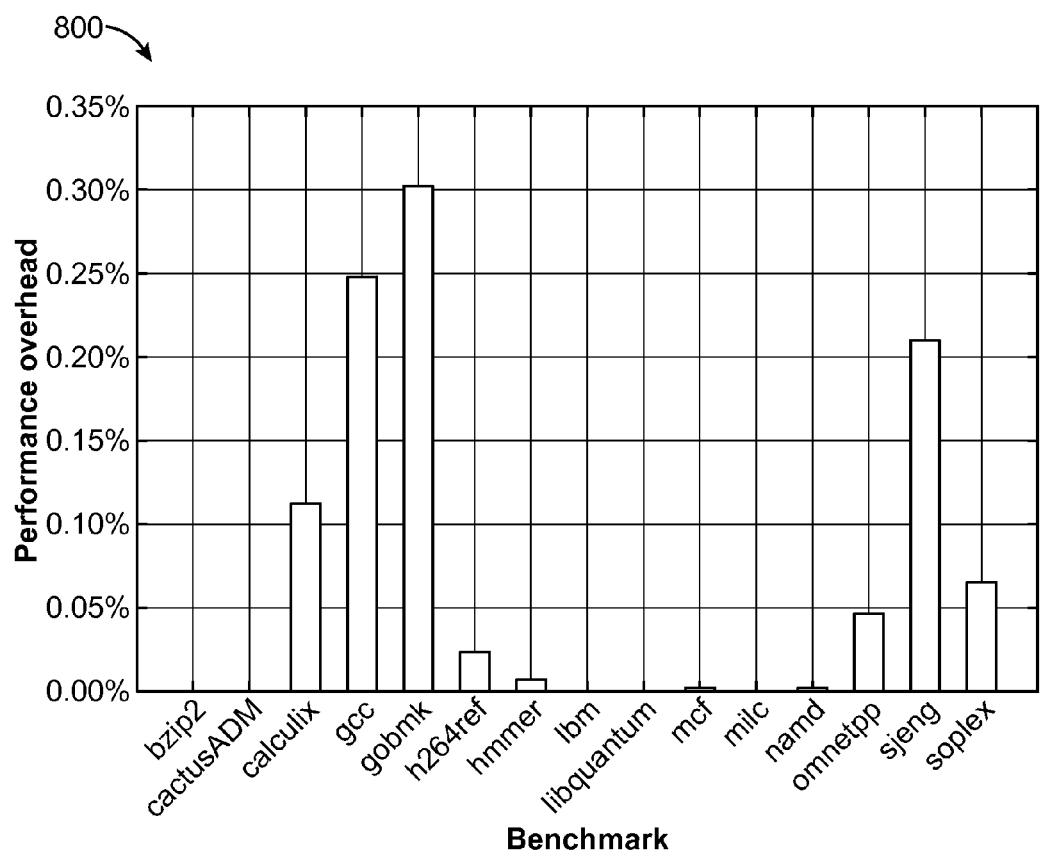

FIG. 8 shows the performance overhead for decryption unit placement at the L1-I and L2 boundary/interface. For the sake of completeness, the scheme where the decryption module is placed at the head of the execution pipeline, i.e., when every instruction fetched from the L1-I is decrypted, was also examined (results shown in FIG. 7). Performance results for the case where decryption occurs between the L2 and memory (i.e., processor memory and non-processor memory interface) were not obtained because decryption latency is much lower than memory fetch latency, resulting in no performance loss. As can be seen from the performance results shown in graphs 700 and 800 of FIGS. 7 and 8, placing the decryption unit before the pipeline is generally prohibitively expensive (from a computational effort perspective), whereas the other choice incurs nominal overhead. From a high level perspective, execution overhead will be correlated to how often instruction decryption occurs. Placing the decryption module at the cache interfaces results in minimal overhead because of locality at the caches. This seems to be especially true for benchmarks like gcc, gobmk and sjeng which suffer from a lot of L1-I misses. In such cases, it is advantageous to implement the third choice for placement of the decryption unit, namely, at boundary/interface between the processor-memory (cache) and the non-processor memory, where the performance overhead is low regardless of the cache miss profile (but at the possible cost of more complex processing).

It is also to be noted that physical-area requirements for implementations of the methods, systems, and other implementations described herein generally do not require significant area overhead. Particularly, when the implementations described herein were synthesized for a 32 nm technology node, it was determined that adding an extra 16-entry 128-bit RAM (and the associated circuitry) to the ITLB for storing encryption/decryption keys resulted in an 81% increase in the size of the ITLB, e.g., from 0.295 mm² to 0.536 mm². This should be manageable, however, because the actual core is orders of magnitude bigger than the ITLB. Additionally, a fully-pipelined AES decryption unit was implemented that took 40 cycles to produce a 128-bit plaintext. The synthesized implementation took up 0.407 mm² of die space for the same technology.

A security analysis of the security properties and weaknesses of the ISR processes described herein was conducted for various types of attack, as more particularly discussed below. One type of attack for which the methods, systems, and other implementations described herein were analyzed is "Code Injection" attack. Code-injection attacks are among the most widely known type of software abuse. In particular, these attacks rely on depositing arbitrary executable code inside the address space of a victim process (typically in the form of data), and then transferring control into that code, e.g., by overwriting a function pointer, a dispatch table, or a function return address. Instruction-set randomization generally defeats binary code-injection attacks (when using a cryptographic process not susceptible to known plaintext attacks). The underlying principle behind this ability to defeat code injection attacks is that because an execution engine expects opcodes tailored to a particular ISA, it will not understand those of any other arbitrary ISA and thus fail to execute payloads comprising of such instructions. Even if a valid ISA for a target was to be determined by exploiting some (local) flaw or information leak, the diversity of ISAs in the ecosystem ensures that other systems will not fall prey.

Another type of attack for which the methods, systems, and other implementations described herein were analyzed is the "Code-Reuse" attack. Code-reuse techniques are the attackers' response to the increased adoption of system hardening mechanisms, like ASLR and NX, from commodity systems. The main idea behind code-reuse is to construct the malicious payload by reusing instructions already present in the address space of a vulnerable process. For example, if the attacker manages to diverge the control flow to the beginning of a library function such as libc's system, then the attacker can spawn a shell without the need to inject any code. In most cases, however, invoking a single function is not enough for a successful compromise—multiple return-to-libc calls need to be "chained" together by reusing short instruction sequences. Return-Oriented Programming (ROP) takes this idea to the extreme by using only a carefully selected set of short instruction sequences, known as gadgets, for performing arbitrary computations. Note that ROP has been shown to be Turing complete, thus eliminating the need for calling libc functions. This technique gives the attacker the same level of flexibility offered by arbitrary code injection without injecting any new code at all. The malicious payload comprises just a sequence of gadget addresses intermixed with any necessary data arguments. However, in most publicly available exploits so far, attackers do not rely on a fully ROP-based payload. Typically, ROP code is used only as a first step for bypassing NX: it allocates a memory area with write and execute permissions, by calling a library function like VirtualAlloc or mprotect, copies into it some plain shellcode, and finally transfers control to the copied shellcode that now has execute permissions. ISR cannot protect against pure code-reuse attacks, since the attacker can construct his payload without knowing the underlying ISA. However, there are no pure practical code-reuse attacks, and the methods, systems, and other implementations described herein thwart multi-stage code-reuse exploits that rely on code injection. Additionally, the methods, systems, and other implementations described herein are orthogonal to many techniques for mitigating pure code-reuse attack.

Another type of attack is one based on BIOS/Boot vulnerabilities. Before an OS provides privilege-protection (often with assistance from hardware), a typical system boots into a BIOS and eventually to a bootloader. These two modules are promising targets for attackers, since they offer virtually unrestricted access to system resources with few (if any) monitors on their activity. Employing ISR at these stages using predetermined secret keys ensures that they cannot be patched or replaced with unverified code.

A further attack type is one that employs self-modifying code (SMS). ISR complicates applications that employ self-modifying code (SMC), such as just-in-time (JIT) compilers. To counter these types of attacks, such applications can be either completely disallowed, or can be selectively permitted to run with a significant reduction on the security guarantees offered. Allowing SMC requires different approaches depending on the mode of ISR under consideration. For System ISR, if the SMC agent is considered part of the TCB, it could be allowed access to the system key. This significantly weakens system security by increasing the attack surface substantially and, therefore, is not very appealing. In case of Page ISR, the SMC (or JIT) engine could either execute the generated code pages with null-keys, or encrypt it with a set of self-generated keys. Either way, some trust has to be offloaded to the SMC agent.

Although the Instruction Set Randomization (ISR) methods, systems, and other implementations described herein provide diversity and thus raise the bar for wide-scale exploitation, ISR is susceptible to some forms of attack. ISR's weaknesses include:

a) Trusted OS—Page ISR requires a trusted system (e.g., verified OS module) component to perform the key management for each page (per process). Unfortunately, commodity OSes are vulnerable to compromises, and are nowadays increasingly attractive targets.

b) Data-Only Attacks—Since ISR does not guarantee data integrity, it is susceptible to data-only attacks (attacks that do not touch control data or modify code execution). Moreover, for applications that leak information through processed data, program state may be gleaned by observing its data.

c) Denial-of-Service (DoS) Attacks—DoS attacks may be carried out by repeatedly patching a program with illegal code, and crashing it with "illegal instruction" exceptions. However, under most circumstances this is considered acceptable behavior.

In spite of the above indicated weaknesses/drawbacks, additional security and integrity measures can be adopted on top of ISR to overcome these (or future) issues and make it more robust.

The challenges for implementing ISR-based security extend beyond merely diversification at the hardware level, and require careful implementation of software distribution schemes and systems. Two different models for software distribution were considered. One was a model for System ISR with a constant IV, and the other was Page ISR with unique key per page. These represent two different points on the implementation spectrum for software distribution.

Figures 9, 10:
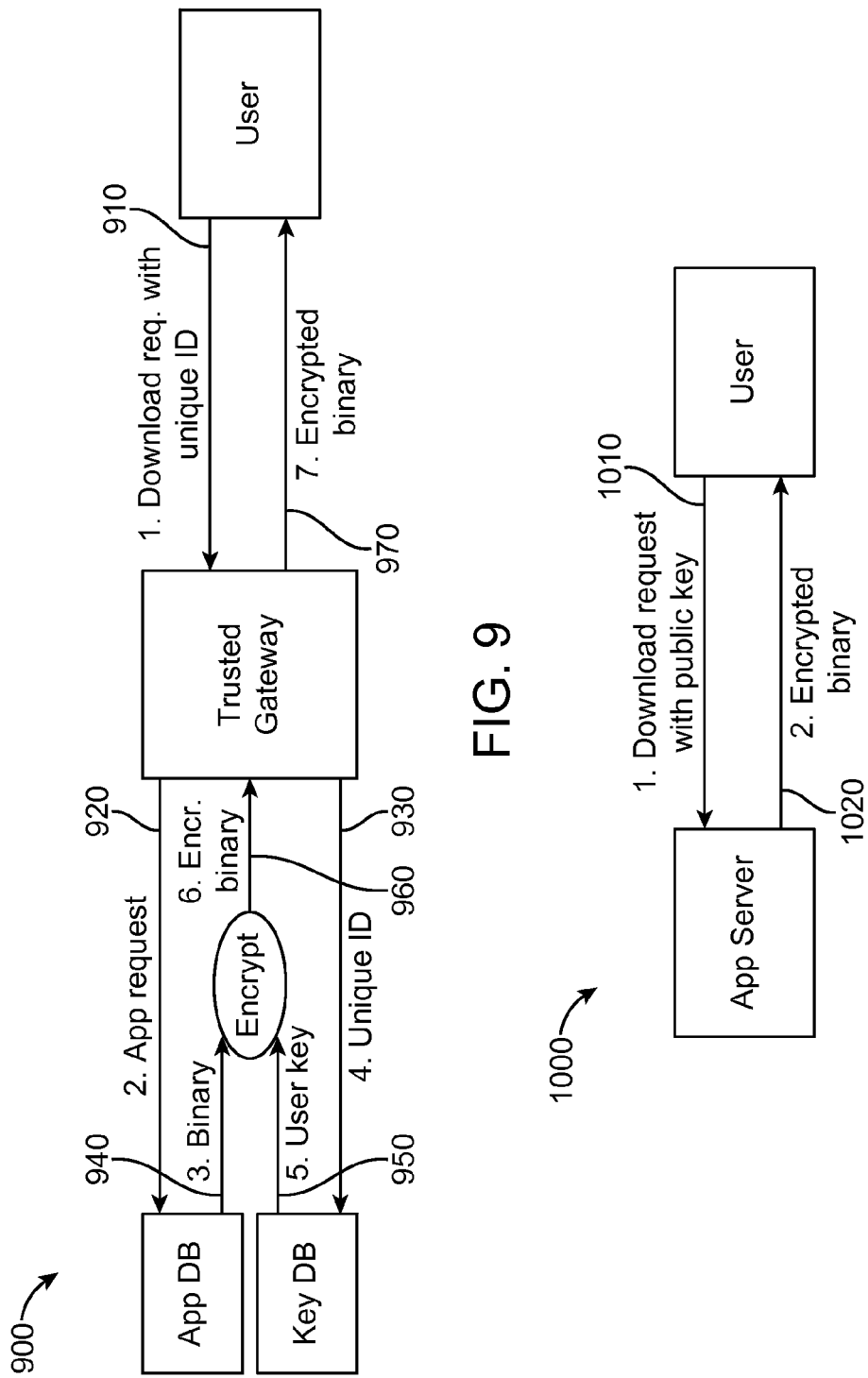
FIG. 9 is a flow diagram illustrating example software distribution operations in a System Instruction Set Randomization implementation.
FIG. 10 is a flow diagram illustrating example software distribution operations in a Page Instruction Set Randomization implementation.

Starting first with a System ISR implementation, application distribution for this case can be explained in the context of the app-store model (note that if regular counter-mode was to be used, system ISR can also be implemented in the non app-store model). When a user downloads an app from the app-store, the app-store encrypts the binary with the ISR key for that device. FIG. 9 is a flow diagram 900 illustrating example software distribution operations, which include:

(1) The chip-key as well as the unencrypted application binaries are collected and archived in trusted key and app databases respectively.

(2) When a user chooses to install an application, the user sends a request (at operation 910) to the gateway server.

(3) The gateway then sends fetch requests for the corresponding binary (at operation 920) as well as the user's key (at operation 930), which is retrieved (at operations 940 and 950). Retrieval of the user's key is based on a unique ID that may have been sent as part of the user's request.

(4) The binary is encrypted with the fetched key (at operation 960) and sent to the user's machine (at operation 970).

Key Management for System ISR may be performed as follows. Each processor chip is programmed with a unique random AES key. One simple way for producing chips with different keys is to include some nonvolatile memory on a die and then program it with a serial number and secret symmetric keys after manufacturing, perhaps using a chip tester. In the example methods, systems, and other implementations described herein, the chip manufacturer (or its proxy) is trusted to safely hold the keys and provide encryption service to authorized serial numbers. In the event the key is inadvertently leaked or lost, the manufacturer may remotely re-program the non-volatile memory using, for example, secret microcode instructions (which are generally not ISRized). To Bootstrap with a System ISR implementation, the System ISR implementation can be turned on right from boot-up. In such a case, even the BIOS, firmware and bootloader may be encrypted. No other major code or design changes need be done for these modules, but rather a simple binary rewriting pass with the AES key is sufficient to ISRize the system. It is to be noted that diversification does not hinder or change existing secure boot schemes where the bootloader and/or OS are verified for integrity (e.g., via comparison with some known or expected measurement of hashes on the binary image). Importantly, however, because of ISR, the measurement to be verified will not be the same across systems.

Two risks associated with a System ISR implementation include the fact that use of a single key increases risk of misuse/loss, and the fact that applications are required to go through the app store, which might give rise to a host of undesirable problems (absence of single trusted distribution authority, less flexibility, privacy, etc.). Page ISR implementation resolves these problems with a flexible key utilization system allowing use of arbitrary keys.

When a developer wants to distribute an application under a Page ISR implementation, the developer could be using the page-level granularity of encryption, i.e., encrypt different code pages with different keys (however, in some embodiments, one key could correspond to more than one page). FIG. 10 is a flow diagram 1000 showing a sequence of operations to distribute software in a Page ISR implementation. The sequence of operations includes the following operations:

(1) Users send (at operation 1010) download request to the app server. The public key is embedded in the request.

(2) For every download request, an app server receives for his application, the app server encrypts (at operation 1020) the binary with a symmetric encryption process such as AES using developer-generated keys. These key-to-address mappings may then be encrypted using the public key from user request, packaged with the binary (as an ELF section, for instance) and forwarded (also illustrated at operation 1020) to the user.

Because the binary code is encrypted with developer-generated keys, which are in turn encrypted with the chip's public key, code confidentiality is guaranteed because the chip's private key is never revealed (generally not even to its owner). Moreover, even if the symmetric keys for an application were to be leaked, they would not compromise the rest of the system. Alternatively, if code confidentiality is not necessary, applications can be downloaded in plaintext and encrypted locally.

To Bootstrap with a Page ISR implementation, the BIOS initializes the bootloader, which then initializes the OS, which provides paging. To allow ISR during this process, one key for the entire BIOS program may be used with the physical load addresses acting as the counter values. The BIOS and bootloader can be prepared the same way as single key ISR applications are prepared for execution. When the OS gains control, it initializes the page tables of its own code pages with keys that were used to encrypt it. From this point onwards (i.e., after virtual memory has been set up), the system starts operating in Page ISR.

When a program is executed, the loader extracts the encrypted key-to-page mapping from the binary and passes this information to the OS. The OS then either decrypts this mapping using the system's private key itself or asks the hardware to do so in case trusting the OS with the private key is not desirable. Once it has the decrypted mappings, it is responsible for installing the keys corresponding to each code page, both in the hardware and software address-translation mechanisms. One way to facilitate hardware translation is to extend existing page table data fields with an additional field for the 128-bit key. The OS can install the appropriate keys to each page-table entry on a page fault, which can then be transferred to the ITLB by the hardware on every ITLB miss. The decryption process uses lower order page offset bits as the counter. This can be automatically inferred at runtime and the need to store IVs does not arise.

Also tested was a mechanism to prevent circumvention the encryption/decryption-based security mechanism causing a block of information containing malicious instructions to be identified as non-instruction data and subsequently using that block of information as instruction data. As discussed herein, care needs to be taken not to allow instruction data (e.g., code data) to be treated as regular data, and vice versa.

When an entry in the I-cache is not found, the translation determines the instruction fetch process. As instructions are fetched from memory, a key (e.g., a symmetric key) is used to decrypt them and deposit them in plaintext in the I-cache. The challenge, however, is that although symmetric decryption is much faster than asymmetric decryption, instruction fetches are fairly more common. Adding decryption latency to the critical fetch path will cause impractical performance overheads, rendering implemented systems unusable (this is the main reason other solutions opt for inexpensive encryptions like XOR or bit-transposition). To deal with this problem, symmetric encryption is used in counter mode. In this mode, the actual decryption is performed on a counter value, which is then (usually) XOR'ed with the actual data to obtain plaintext. Given the fact that XOR is a cheap operation (e.g., from a computational effort perspective), if the appropriate counter value could be determined when the miss is encountered, and decryption can then be commenced early, instruction fetch and decryption could proceed in parallel. Moreover, if fetch latency is greater than decryption latency, no performance overhead would be observable.

In the implementations discussed herein, the counter is obtained from the lower bits of memory address. How many bits constitute the counter depends on which level (and hence how much memory it covers) an ISR PTE is implemented in. This information is also available readily during binary encryption statically. It is to be noted that the counter is not required to be secret. As long as keys are not repeated for multiple pages, this scheme will be secure. The SPARC32 implementation of Leon3 only has a single level of split caches. Therefore, the decryptor may be placed at the I-cache-memory interface (as was done by ASIST). However modern systems have multiple levels of unified cache. For such, the implementation choice of placing the decryptor between the on-chip LLC (last-level cache) and memory for energy and performance reasons may be realized. However, because only code needs to decrypted, the source of a miss needs to be tracked all the way to this level. With this scheme instructions are decrypted before being filled into the LLC, and remain decrypted in the lower levels where most of the accesses hit, significantly reduces the penalty of ISR.

As noted, the microarchitecture optimization choice of pushing decryption beyond the L1 creates a security vulnerability. Suppose a cache block was fetched from DRAM into the L2 in response to a data load request, and supposed that this data is also requested by L1-I. In this scenario, the block, which came in as data without going through the decrypting process, is now fed as-is to the L1-I and eventually makes its way into the pipeline, thus completely bypassing ISR. An attack vector to exploit this might thus involve first loading the shell-code, crafted in native ISA, as data, and referencing the same locations for execution soon thereafter while they are still in L2. Conversely, consider the case when a block that resides in L2 is fetched as an L1-I fill, i.e., as an instruction, but is eventually requested by the L1-D. The decrypted instruction (in a form which can be easily disassembled) can now be treated as data. In such a scenario, it is not hard to imagine a well-crafted attack reading off decrypted instructions from known locations. Given the location and the decrypted instruction, a reliable dictionary of instruction mapping could be constructed that can be used to construct valid pieces of ISRized code.

As discussed, this type of attack can be prevented for these cases by tracking instructions and data cache blocks in all caches beyond L1. This can be accomplished by adding a bit (or more than 1 bit) to each cache block indicating whether it is instruction or data. This bit is set by tracking the first source of the miss, i.e., the instruction or the data cache. Only blocks marked as instruction can be fed to the L1-I and vice versa for data. Cross-sharing between the split caches is thus completely disallowed, either directly or through L2. If L2 receives a request from the L1-I for a block marked data, that block has to be flushed to memory and fetched again, this time going through the decryption process. Similarly, when a block marked instruction is requested as data, it is flushed and fetched again; only now the decryption module will be bypassed during the L2 fill.

In conclusion, as described herein, once a security flaw is discovered, attacks exploiting it can be quickly and widely deployed due to the homogeneity of computing ecosystem. Diversity is a desirable feature to limit the damage such security lapses cause. In the methods, systems, and other implementations described herein, a solution for randomizing instruction sets that is secure and has minimal performance overheads was described. In the approaches discussed herein, instruction streams are encrypted with AES and are decrypted before execution (e.g., at a decryption unit placed at an interface/boundary between processor memory and non-processor memory). The encryption key(s) (e.g., based on AES) is kept secret to prevent development of unauthorized binaries.

The implementations described herein include microarchitectural optimizations to implement the above-described approaches with minimal overhead. One feature of the ISR solution described herein is that simple modifications in hardware allow broad security coverage. For example, the implementations described herein can protect against various binary code-injection attacks.

Also explored herein was the issue of how entire ecosystems could be developed around the different types of proposed ISR. An advantage of these diversification approaches based on ISR is that they employ practical cryptographic primitives and can be built on top of established models. Moreover, they are orthogonal to, and can be used alongside, most other code-signing and security measures to further harden systems.

ISR provides a foundation for further security improvements. One such direction is offloading key-management to hardware so that the requirement of a trusted OS can be done away with, thus evicting thousands of lines of software code from the sphere of trust. Yet another direction is to extend encryption to data items (e.g., non-instruction data), which can open the way for truly obfuscated and practical "dark execution," which is particularly significant when executing programs on remote clouds.

Although particular embodiments have been disclosed herein in detail, this has been done by way of example for purposes of illustration only, and is not intended to be limiting with respect to the scope of the appended claims, which follow. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
    receiving a block of information from non-processor memory at an interface between the non-processor memory and processor memory comprising two or more processor memory levels;
    determining whether the block of information received from the non-processor memory at the interface corresponds to encrypted instruction code; and
    decrypting the block of information at the interface between the non-processor memory and the processor memory for storage in one of the two or more levels of the processor memory in response to a determination that the received block of information corresponds to the encrypted instruction code, wherein the block of information is stored at the one of the two or more levels of the processor memory without being decrypted when the received block of information is determined to correspond to data, wherein decrypting the block of information corresponding to the encrypted instruction code at the interface between the processor-memory and the non-processor memory comprises decrypting the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device.

2. The method of claim 1, wherein the processor memory comprises cache memory of a central processing unit (CPU) organized in two or more cache memory levels, and wherein the non-processor memory comprises random access memory.

3. The method of claim 1, wherein determining whether the block of information received from the non-processor memory at the interface corresponds to the encrypted instruction code comprises:
    determining whether the block of information received from the non-processor memory at the interface corresponds to the encrypted instruction code based on a request sent for the block of information.

4. The method of claim 3, wherein determining whether the block of information received from the non-processor memory corresponds to the encrypted instruction code comprises:
    determining that the block of information received from the non-processor memory at the interface corresponds to the encrypted instruction code when the request for the block of information is associated with a portion of the processor-memory configured to store instructions.

5. The method of claim 3, further comprising:
    associating an identifier with the received block of information; and
    setting the identifier to a value indicating one of instructions or data based on the determination of whether the block of information corresponds to the encrypted instruction code received from the non-processor memory.

6. The method of claim 5, further comprising:
    determining, in response to a fetch request made by an instruction portion of another level of the two or more levels of the processor memory for at least a portion of the block of information stored at the one of the two or more levels of the processor memory, whether the identifier associated with the block of information stored at the one of the two or more levels of the two or more levels of the processor memory corresponds to the instructions; and
    performing one of:
        transferring the at least the portion of the block of information stored at the one of the two or more levels of the processor memory to the instruction portion of the other of the two or more levels of the processor memory when the identifier associated with the block of information is determined to correspond to the instructions; or
        removing the block of information from the processor memory when the identifier associated with the block of information is determined to correspond to the data, and causing the block of information to be retrieved again from the non-processor memory in order to perform a decryption operation on the block of information retrieved again.

7. The method of claim 5, further comprising:
    determining, in response to a fetch request made by a data portion of another level of the two or more levels of the processor memory for at least a portion of the block of information stored at the one of the two or more levels of the processor memory, whether the identifier associated with the block of information stored at the one of the two or more levels of the processor memory corresponds to the data; and
    performing one of:
        transferring the at least the portion of the block of information stored at the one of the two or more levels of the processor memory to the data portion of the other of the two or more levels of the processor memory when the identifier associated with the block of information indicates that the block of information corresponds to the data; or
        removing the block of information from the processor memory when the identifier associated with the block of information indicates that the block of information corresponds to the instructions, and causing the block of information to be retrieved again from the non-processor memory in order to be transferred into the processor memory without being decrypted.

8. The method of claim 1, wherein decrypting the block of information corresponding to the encrypted instruction code with the one or more first keys assigned to the first controller device comprises:
    decrypting the encrypted instruction code with one or more first symmetric keys according to a counter mode encryption/decryption process, wherein the one or more first symmetric keys comprises one of: a single symmetric key used for any encrypted instruction code retrieved by the first controller device, or multiple symmetric keys with each of the multiple symmetric key used for respective encrypted instructions from a respective one of different memory pages stored in the non-processor memory coupled to the first controller device.

9. The method of claim 1, wherein decrypting the block of information corresponding to the encrypted instruction code at the interface between the processor-memory and the non-processor memory comprises:
retrieving from the non-processor memory one or more symmetric keys, encrypted using a public key of a private-public key pair for a processor, associated with a code page; and
deriving the one or more symmetric keys from the encrypted one or more symmetric keys using a private key of the private-public key pair for the processor.

10. The method of claim 9, wherein retrieving the one or more symmetric keys comprises:
retrieving the encrypted one or more symmetric keys during page-fault-processing to retrieve into the non-processor memory the code page.

11. The method of claim 9, wherein deriving the one or more symmetric keys comprises:
deriving from the encrypted one or more symmetric keys one or more AES keys.

12. A system comprising:
a processor comprising processor memory with two or more processor memory levels; and
a decryption unit at an interface between non-processor memory and the processor memory, the decryption unit configured to:
receive a block of information from the non-processor memory;
determine whether the block of information received from the non-processor memory corresponds to encrypted instruction code; and
decrypt the block of information for storage in one of the two or more levels of the processor memory in response to a determination that the received block of information corresponds to the encrypted instruction code, wherein the block of information is stored at the one of the two or more levels of the processor memory without being decrypted when the received block of information is determined to correspond to data, wherein the decryption unit configured to decrypt the block of information corresponding to the encrypted instruction code at the interface between the processor-memory and the non-processor memory is configured to decrypt the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device.

13. The system of claim 12, wherein the processor memory comprises cache memory of a central processing unit (CPU) organized in two or more cache memory levels, and wherein the non-processor memory comprises random access memory.

14. The system of claim 12, wherein the decryption unit configured to determine whether the block of information received from the non-processor memory at the interface corresponds to the encrypted instruction code is configured to:
determine whether the block of information received from the non-processor memory at the interface corresponds to the encrypted instruction code based on a request sent for the block of information.

15. The system of claim 14, wherein the decryption unit configured to determine whether the block of information received from the non-processor memory corresponds to the encrypted instruction code is configured to:
determine that the block of information received from the non-processor memory at the interface corresponds to the encrypted instruction code when the request for the block of information is associated with a portion of the processor-memory configured to store instructions.

16. The system of claim 14, wherein the decryption unit is further configured to:
associate an identifier with the received block of information; and
set the identifier to a value indicating one of instructions or data based on the determination of whether the block of information corresponds to the encrypted instruction code received from the non-processor memory.

17. The system of claim 16, wherein the processor is configured to:
determine, in response to a fetch request made by an instruction portion of another level of the two or more levels of the processor memory for at least a portion of the block of information stored at the one of the two or more levels of the processor memory, whether the identifier associated with the block of information stored at the one of the two or more levels of the two or more levels of the processor memory corresponds to the instructions; and
perform one of:
transferring the at least the portion of the block of information stored at the one of the two or more levels of the processor memory to the instruction portion of the other of the two or more levels of the processor memory when the identifier associated with the block of information is determined to correspond to the instructions; or
removing the block of information from the processor memory when the identifier associated with the block of information is determined to correspond to the data, and causing the block of information to be retrieved again from the non-processor memory in order to perform a decryption operation on the block of information retrieved again.

18. The system of claim 16, wherein the processor is configured to:
determine, in response to a fetch request made by a data portion of another level of the two or more levels of the processor memory for at least a portion of the block of information stored at the one of the two or more levels of the processor memory, whether the identifier associated with the block of information stored at the one of the two or more levels of the processor memory corresponds to the data; and
perform one of:
transferring the at least the portion of the block of information stored at the one of the two or more levels of the processor memory to the data portion of the other of the two or more levels of the processor memory when the identifier associated with the block of information indicates that the block of information corresponds to the data; or removing the block of information from the processor memory when the identifier associated with the block of information indicates that the block of information corresponds to the instructions, and causing the block of information to be retrieved again from the non-processor memory in order to be transferred into the processor memory without being decrypted.

19. The system of claim 12, wherein the decryption unit configured to decrypt the block of information corresponding to the encrypted instruction code with the one or more first keys assigned to the first controller device is configured to:

decrypt the encrypted instruction code with one or more first symmetric keys according to a counter mode encryption/decryption process, wherein the one or more first symmetric keys comprises one of: a single symmetric key used for any encrypted instruction code retrieved by the first controller device, or multiple symmetric keys with each of the multiple symmetric key used for respective encrypted instructions from a respective one of different memory pages stored in the non-processor memory coupled to the first controller device.

20. The system of claim 12, wherein the decryption unit configured to decrypt the block of information corresponding to the encrypted instruction code at the interface between the processor-memory and the non-processor memory is configured to:

retrieve from the non-processor memory one or more symmetric keys, encrypted using a public key of a private-public key pair for a processor, associated with a code page; and derive the one or more symmetric keys from the encrypted one or more symmetric keys using a private key of the private-public key pair for the processor.

21. A non-transitory computer readable media storing a set of instructions executable on at least one programmable device that, when executed, causes operations comprising:

receiving a block of information from non-processor memory at an interface between the non-processor memory and processor memory comprising two or more processor memory levels;

determining whether the block of information received from the non-processor memory at the interface corresponds to encrypted instruction code; and decrypting the block of information at the interface between the non-processor memory and the processor memory for storage in one of the two or more levels of the processor memory in response to a determination that the received block of information corresponds to the encrypted instruction code, wherein the block of information is stored at the one of the two or more levels of the processor memory without being decrypted when the received block of information is determined to correspond to data, wherein decrypting the block of information corresponding to the encrypted instruction code at the interface between the processor-memory and the non-processor memory comprises decrypting the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device.

22. An apparatus comprising:

means for receiving a block of information from non-processor memory at an interface between the non-processor memory and processor memory comprising two or more processor memory levels;

means for determining whether the block of information received from the non-processor memory at the interface corresponds to encrypted instruction code; and means for decrypting the block of information at the interface between the non-processor memory and the processor memory for storage in one of the two or more levels of the processor memory in response to a determination that the received block of information corresponds to the encrypted instruction code, wherein the block of information is stored at the one of the two or more levels of the processor memory without being decrypted when the received block of information is determined to correspond to data, wherein the means for decrypting the block of information corresponding to the encrypted instruction code at the interface between the processor-memory and the non-processor memory comprises means for decrypting the block of information corresponding to the encrypted instruction code with one or more first keys assigned to a first controller device associated with a particular instruction set, the one or more first keys being different from at least one key assigned to a second controller device associated with the particular instruction set so as to emulate instruction set diversification between the first controller device and the second controller device.

* * * * *